(12) United States Patent
Izatt et al.

(10) Patent No.: US 7,075,658 B2
(45) Date of Patent: Jul. 11, 2006

(54) METHOD FOR OPTICAL COHERENCE TOMOGRAPHY IMAGING WITH MOLECULAR CONTRAST

(75) Inventors: Joseph A. Izatt, Durham, NC (US); Divakar K. Rao, Indore (IN); Changhuei Yang, Durham, NC (US); Michael A. Choma, Durham, NC (US); Siavash Yazdanfar, Cambridge, MA (US); Andrew M. Rollins, Cleveland, OH (US); Brian E. Applegate, Durham, NC (US)

(73) Assignees: Duke University, Durham, NC (US); Case Western Reserve University, Cleveland, OH (US)

( * ) Notice: Subject to any disclaimer, the term of this patent is extended or adjusted under 35 U.S.C. 154(b) by 180 days.

(21) Appl. No.: 10/765,010

(22) Filed: Jan. 26, 2004

(65) Prior Publication Data

US 2005/0036150 A1 Feb. 17, 2005

Related U.S. Application Data

(60) Provisional application No. 60/442,054, filed on Jan. 24, 2003.

(51) Int. Cl.
*G01B 9/02* (2006.01)

(52) U.S. Cl. .................................................. 356/479
(58) Field of Classification Search ................ 356/432, 356/479, 497, 502
See application file for complete search history.

(56) References Cited

U.S. PATENT DOCUMENTS

| | | | | |
|---|---|---|---|---|
| 5,706,094 A | * | 1/1998 | Maris | 356/432 |
| 6,002,480 A | * | 12/1999 | Izatt et al. | 356/479 |
| 6,208,886 B1 | * | 3/2001 | Alfano et al. | 600/473 |
| 6,847,454 B1 | * | 1/2005 | Crowley et al. | 356/479 |

* cited by examiner

*Primary Examiner*—Gregory J. Toatley, Jr.
*Assistant Examiner*—Michael A. Lyons
(74) *Attorney, Agent, or Firm*—Jenkins, Wilson, Taylor & Hunt, P.A.

(57) ABSTRACT

Spatial information, such as concentration and displacement, about a specific molecular contrast agent, may be determined by stimulating a sample containing the agent, thereby altering an optical property of the agent. A plurality of optical coherence tomography (OCT) images may be acquired, at least some of which are acquired at different stimulus intensities. The acquired images are used to profile the molecular contrast agent concentration distribution of the sample.

12 Claims, 20 Drawing Sheets

US 7,075,658 B2

METHOD FOR OPTICAL COHERENCE TOMOGRAPHY IMAGING WITH MOLECULAR CONTRAST

RELATED APPLICATIONS

This application claims the benefit of U.S. Provisional Patent Application Ser. No. 60/442,054, filed Jan. 24, 2003; the disclosure of which is incorporated herein by reference in its entirety.

GOVERNMENT INTEREST

This invention was made with Government support under Grant No. R24EB000243 awarded by the National Institutes of Health. The Government may have certain rights in the invention.

TECHNICAL FIELD

The invention relates to optical coherence tomography and, more particularly, to optical coherence tomography with molecular contrast capability.

BACKGROUND ART

Optical coherence tomography (OCT) is an emerging tool for real time in-situ tissue imaging with micrometer-scale resolution. Real-time OCT systems have been integrated into clinical medical diagnostic instruments, and functional extensions such as polarization-sensitive, Doppler, and spectroscopic OCT have recently been introduced. These functional enhancements add the ability to discern contrast due to stress, motion, and to some extent absorber concentration in samples such as biological tissues. However OCT remains a relatively contrast-starved imaging modality due to the low contrast in scattering coefficient between biological tissue types.

DISCLOSURE OF THE INVENTION

An invention is described for acquiring depth resolved optical coherence tomography (OCT) images that can reveal molecular contrast agent distribution in the target. The primary inventive concept of this disclosure which unifies all of the disclosed embodiments may be stated as follows: the purposeful alteration through various means of the optical properties of a sample so that OCT images acquired in coordination with the purposeful alterations may be processed to reveal the spatial locations and/or concentration of specific molecular contrast agents in the sample.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Exemplary embodiments of the invention will now be explained with reference to the accompanying drawings, of which.

DETAILED DESCRIPTION OF THE INVENTION

A. Technical Overview

Figure 1:
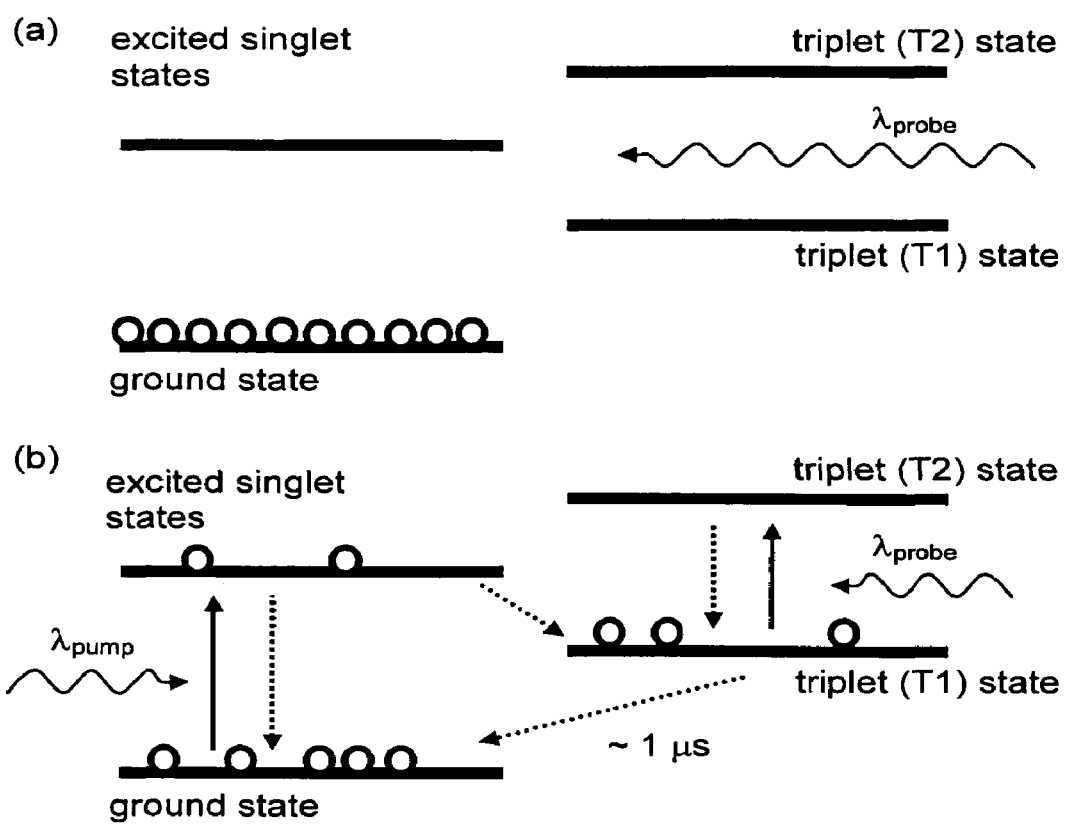
FIG. 1 is a simplified energy level diagram of a dye species.

OCT imaging technology has not yet taken advantage of molecular contrast mechanisms which have revolutionized other medical and biological imaging modalities such as MRI, PET, and SPECT. In particular, other optical techniques such as fluorescence, confocal, and multiphoton microscopy have had tremendous impact because of their capability to image highly specific molecular targets, including antibody-conjugated fluorescent probes and genetically expressible probes such as green fluorescent protein. Unfortunately, OCT is intrinsically insensitive to incoherent scattering processes such as fluorescence or spontaneous Raman scattering, because it depends upon coherent detection of scattered light.

We have previously proposed a general concept for the use of spectroscopic OCT for detection of light from coherent inelastic scattering processes such as stimulated emission, stimulated Raman scattering, and other four-wave mixing processes (J. A. Izatt, M. D. Kulkarni, and M. V. Sivak, "Depth-Resolved Spectroscopic Optical Coherence Tomography," U.S. Pat. No. 6,002,480, issued Dec. 14, 1999). In this disclosure, we present additional concepts for molecular-specific OCT imaging and describe several specific system configurations which optimize signal-to-noise ratio in molecular contrast imaging for various classes of target contrast agents. This new modality is centered on the exploitation of various optical properties in selected contrast agents to elicit changes in the OCT images acquired. These images can then be processed to reveal the concentration distribution of the contrast agents in the target.

The addition of molecular-specific contrast capability to OCT imaging would enable a large number of applications which are not presently possible with OCT. The potential applications for molecular contrast OCT technology include quantitative biological microscopy and noninvasive medical diagnostics. Laboratory OCT microscopy systems adapted for molecular contrast would enable quantitative imaging of exogenous probes and markers in cellular preparations and animal models, with improved imaging depth compared with fluorescence, confocal, or multi-photon microscopy. Contrast agents of interest for molecular contrast OCT include genetically expressible probes under the control of specialized promoters. Clinical OCT systems adapted for molecular contrast may enable diagnostic imaging of endogenous tissue chromophores relevant to disease processes, as well as in situ monitoring of therapeutic processes such as drug delivery.

By analogy to ultrasound imaging, in optical coherence tomography cross-sectional imaging of sub-surface tissue structure ("B-scans") are built up from numerous laterally displaced axial profiles of tissue reflectivity versus depth ("A-scans"). A-scans are acquired by obtaining profiles of optical reflectivity of the sample as a function of depth by use of low-coherence interferometry. The resolution in the depth direction is determined by the coherence length of the light source which is used to illuminate the interferometer, while the lateral resolution is determined by the focusing optics in the arm of the interferometer which delivers light to the sample. Several classes of OCT systems have been reported which use different techniques for acquiring axial and lateral reflectivity information from the sample. Conventional (time-domain) OCT systems perform depth-priority imaging, acquiring A-scans by rapidly scanning the reference arm optical delay, and B-scans by slowly scanning the sample beam across the sample while A-scans are being acquired. "Fast" time-domain systems acquire A-scans up to kHz rates and B-scans up to video rate, while "slow" time-domain systems acquire A-scans at rates up to tens of Hz and B-scans at several seconds/image.

Although this disclosure for the most part assumes that time-domain OCT systems are to be adapted for molecular contrast, it is obvious that the techniques for molecular contrast disclosed herein are also applicable to other classes of OCT systems, which in some cases may deliver superior performance. For example, other classes of OCT systems which acquire depth or lateral reflectivity information in parallel on array detectors (including "full-field OCT," "Fourier-Domain OCT," and others) are particularly well suited to efficient imaging of contrast agents with short excited state lifetimes.

Recent publications, including several by the inventors, have shown that "Fourier-Domain OCT" and a closely related technique known as "Swept-Source OCT," (we will refer to both techniques together as "spectral domain OCT") have significantly superior signal to noise ratio compared to conventional or "time-domain OCT," because the spectral domain techniques effectively acquire all of the data in each A-scan in parallel (M. A. Choma, M. V. Sarunic, C. Yang, and J. A. Izatt, "Sensitivity advantage of swept source and Fourier domain optical coherence tomography," *Optics Express* 11:2183, 2003). This increase in signal-to-noise ratio may be utilized to either obtain OCT images with substantially better image quality in the same acquisition time as in the time domain, or to acquire OCT images with equal image quality in substantially shorter acquisition times. Indeed, spectral domain OCT systems have been demonstrated which acquire complete A-scans at up to 30 kHz (i.e., in under 30 microseconds), which is faster than the highest speed time-domain OCT system demonstrated previously.

It has now become quite clear that spectral domain OCT is superior to time-domain OCT for many biological and medical imaging applications, thus many future commercial OCT systems will likely be based on the spectral domain approach. In the following, we have included disclosure to explicitly include spectral domain techniques, particularly in embodiments for which the spectral-domain approach will be especially favorable. However, it should be appreciated that the primary inventive concept upon which this disclosure is based, as stated above, is independent of the particular OCT system implementation used to obtain the OCT images.

The detailed definitions of pixel, A-scan (line), and B-scan (image) acquisition times referred to in the detailed descriptions below depend upon the specific class of OCT system which is being used to obtain the MCOCT data. In a traditional time-domain OCT system, the pixel acquisition time is the time taken for the reference arm to scan the equivalent of one coherence length in the sample; the A-scan acquisition time is the time taken for each complete reference arm scan (typically corresponding to 100–1000 pixels); and the image acquisition time is the time taken for a collection of many sequential laterally displaced A-scans (typically 100–1000). An "M-scan" is a special case of B-scan for which many sequential A-scans are acquired without accompanying lateral displacement. In spectral domain OCT (SDOCT) including swept source OCT (SSOCT) and Fourier Domain OCT (FDOCT), A-scan data is calculated as the Fourier transform of spectral interferometric data acquired with a fixed reference arm position.

In SSOCT, the spectral interferometric data is itself acquired sequentially as the source wavelength is swept over a predefined range; thus an equivalent pixel acquisition time may be defined for SSOCT as the time required for acquisition of each discrete wavelength step within the complete wavelength scan (the Fourier relations defining the size and number of wavelength steps required to construct the equivalent of a time-domain A-scan are well known). In FDOCT, all wavelengths required to reconstruct a complete A-scan by Fourier transformation are acquired simultaneously on an array detector, thus there is no distinction between the pixel and A-scan acquisition time in FDOCT as they are the same. Both spectral domain techniques (SSOCT and FDOCT) have a significant signal-to-noise advantage overtime-domain techniques (by a factor of 100–1000), thus spectral domain OCT systems may be designed to acquire data up to 100–1000 times faster than time-domain OCT systems, with all else being equal. Thus, the A-scan acquisition times of both types of spectral domain OCT systems can be as fast as the pixel acquisition times of even high-speed time-domain OCT systems, and the B-scan acquisition times of spectral domain systems can be comparable to the A-scan acquisition times of time-domain systems.

B. Disclosed Embodiments

This disclosure describes four general methods for implementing molecular contrast in OCT. The first (section B.1) relies on the use of pump-probe techniques to selectively and transiently change the absorption of a contrast agent in order to reveal contrast agent distribution in OCT scans. The second (section B.2) is based on using the saturated absorption characteristics of a contrast agent to reveal agent distribution in OCT scans. The third (section B.3) depends on the refractive index changes that occur in concurrence with induced absorption changes created by pump-probe techniques to reveal contrast agent distribution in OCT scans. The fourth (section B.4) describes the use of photon mixing techniques to elicit molecular-specific contrast. The final section (section B.5) describes image processing techniques which may be used with all of the foregoing general methods to generate images of molecular contrast which may be readily interpreted.

B.1 Pump Probe OCT (PPOCT)

Generally speaking, pump probe OCT relies on the use of one or more pumps to transiently change the absorption of the target contrast agent at a probe wavelength which is used as the wavelength of an OCT imaging system. The pump effects change in the contrast agent absorption by transferring or "pumping" population from one eigenstate to another, thereby altering the optical properties of the contrast agent at the probe wavelength. While we will focus on techniques which use laser radiation as the pump, it is possible to use other pumps, for instance electric currents, thermal heating, DC or low-frequency electric fields, magnetic fields, or chemical reactions. For the circumstance of a laser based pump, we note that the pump and probe wavelengths need not be different. The difference in the OCT signal acquired at the probe wavelength as a function of the pump intensity can then be used to profile the contrast agent concentration distribution in the target sample. The transient nature of the target absorption can be used to implement time-gated or frequency-domain signal processing schemes which maximize the signal-to-noise ratio in the associated measurement. Such a scheme requires the use of molecular systems as contrast agents which possess molecular dynamics or excited state manifolds that provide for efficient manipulation of eigenstate populations at the pump wavelength to effect change in the OCT wavelength absorbance. It is to be understood that the change in absorption may be of either sign, which is to say that the pump beam may either increase or decrease the absorption of the sample at the probe wavelength. It is also to be understood that the absorption itself may be of either sign; positive absorption corresponds to absorption in the conventional sense, and negative absorption corresponds to stimulated emission, which is a coherent process and is thus compatible with interferometric detection.

Figure 4:
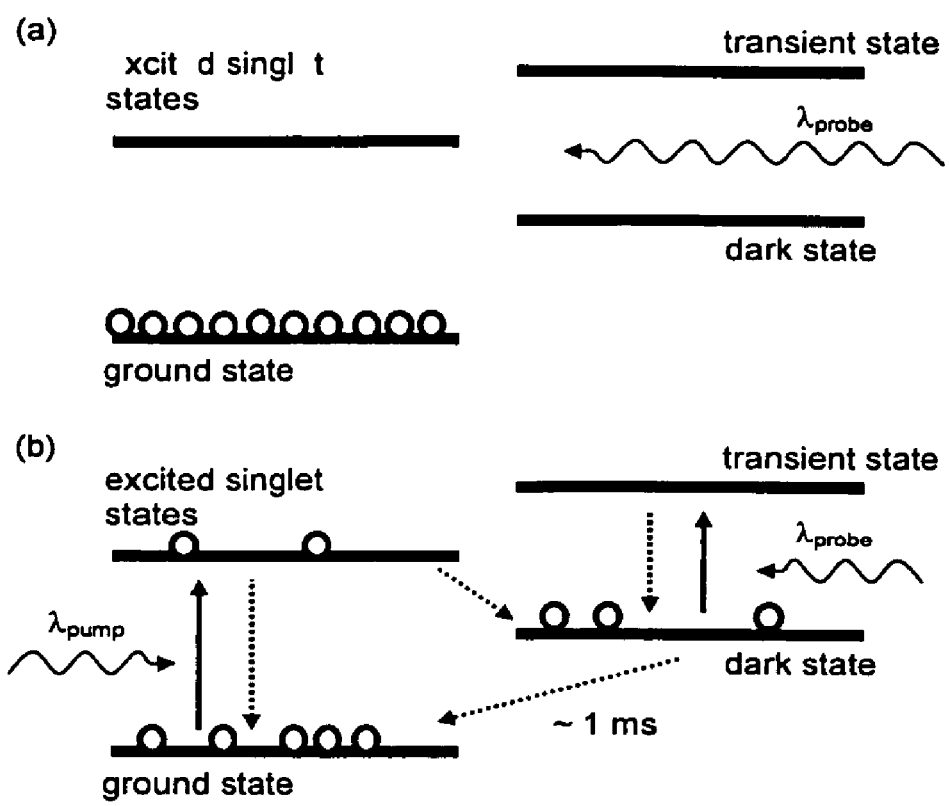
FIG. 4 is a simplified energy level diagram for a dye species having a long lived intermediate state.

There are several classes of contrast agents that are suitable for detection with PPOCT. The difference between these classes lies in the intermediate state(s) lifetime(s), as depicted in FIG. 1 and FIG. 4. In simple terms, there is generally a time duration for which a specific contrast agent will remain in a state, where it is absorptive at the probe wavelength, after being excited at the pump wavelength. This duration can be very short or significantly long, depending on the intermediate state(s) that is (are) involved. The lifetime of the transient absorption can vary from femtoseconds to infinity, depending on the natural lifetimes of the eigenstates to which population is transferred as a result of the pump radiation. By transient absorption lifetime, we mean the time required for the molecular system to return to the state it was in, before interacting with the pump radiation. In general the shortest lifetimes ($10^{-15}$s–$10^{-7}$s) will be for schemes only involving formally allowed transitions. The intermediate lifetimes ($10^{-6}$s–1s) will be for schemes involving spin forbidden transitions or spontaneously reversible geometric or structural isomerizations. The longest lifetimes will be for schemes involving monitoring photoproducts either of the contrast agent or photoinduced reactions of the contrast agent with endogenous molecules, permanent isomerization of the contrast agent, or oxdation/reduction. In many cases the transient absorption lifetime will vary significantly, sometimes orders of magnitude, based upon the environment of the molecular contrast agent, hence time resolving the pump-probe delay may yield depth resolved information about the local environment, including, but not limited to, local pH, oxygenation, and hydration. In general, longer transient absorption lifetimes are better suited for serving as sources for contrast in OCT, where lower peak and average powers are more compatible with biological tissues and are far more economical. The schemes for detection of these three different classes of contrast agents are significantly different.

The signal processing schemes disclosed herein for extracting depth-resolved molecular contrast information from OCT signals are dependent on the relationship between the transient absorption lifetime and the data acquisition rate of the OCT system being used to acquire PPOCT signals. Given a contrast agent with a transient absorption lifetime of interest, an optimal OCT system may potentially be designed to image it. If the transient absorption lifetime, $\tau$, is much shorter than the OCT pixel acquisition time (i.e. the time taken for a time-domain OCT system to axially scan one coherence length, for a SSOCT system to scan one wavelength step, or for an FDOCT system to acquire one A-scan), then transient absorption of the OCT probe light repeats many times during the acquisition of each pixel, and for this situation a scheme is disclosed which treats the PPOCT signal as a supermodulation of the OCT signal, including appropriate demodulation algorithms to separate PPOCT information from the combined interferometric signal (section B.1.1 below). This would be the case for $\tau \sim 1$ µs using a slow-scan OCT system, or $\tau \sim 1$ ns using a rapid-scan (RSOD-based) or spectral domain OCT system. If $\tau$ is on the same temporal order as the pixel acquisition time, and the duty cycle of the pump laser is low, then a scheme is disclosed wherein OCT pixels or groups of pixels are acquired at a multiple of the pump beam repetition rate, and the PPOCT signal is derived from the averaged difference of the OCT pixels with the pump on and off using boxcar integration (section B.1.2 below). This scheme is intrinsically quite inefficient if the probe beam is continuous-wave, however it can be made efficient if the probe beam is also pulsed with a comparable duty cycle. If the molecule of interest has τ either of the same temporal order or longer than the pixel acquisition time (or an OCT system may be designed specifically to meet this requirement), and the duty cycle of the pump laser approaches 0.5, then either one or many pixels (potentially comprising entire A-scans or images) may be all acquired during a pumped intermediate state lifetime, and compared with the same data acquired when the pump laser is off (section B.1.3 below).

Figure 2A:
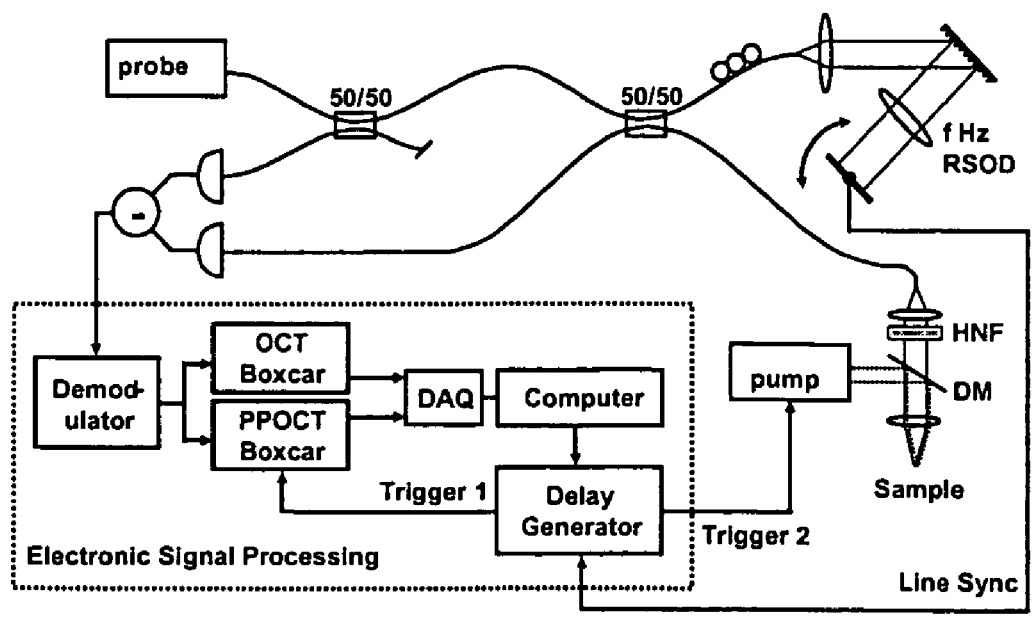
FIG. 2A is an exemplary embodiment of a PPOCT system for pixel acquisition in the time domain in accordance with one aspect of the invention.
Figure 2B:
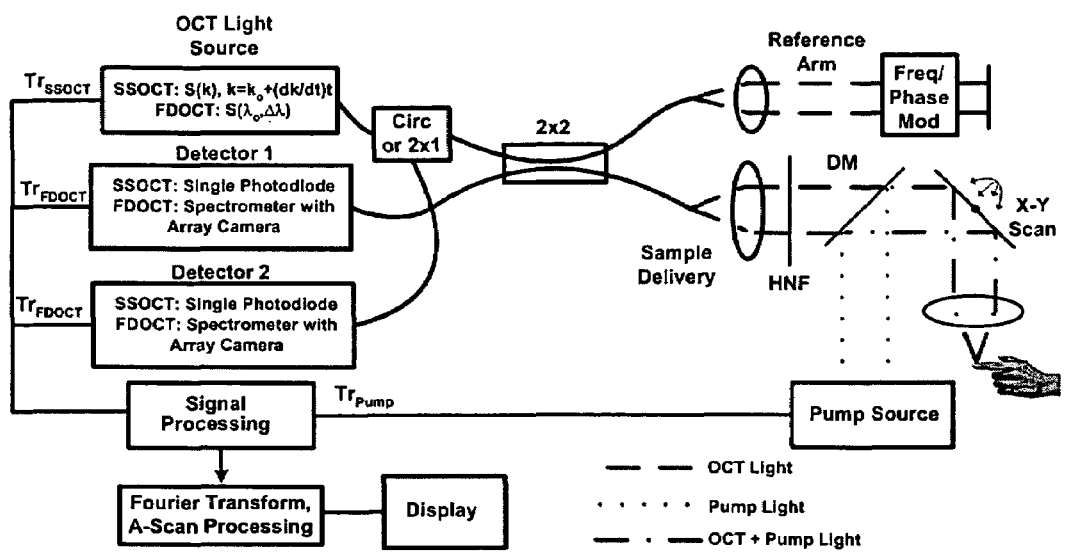
FIG. 2B is an exemplary embodiment of a PPOCT system for pixel acquisition in the spectral domain in accordance with another aspect of the invention.

The general scheme for all PPOCT approaches is illustrated for time-domain OCT in FIG. 2A, and for spectral domain OCT in FIG. 2B. In general, an OCT system may be implemented using a light source exhibiting transient absorption for a period following exposure of the sample to the pump beam. The OCT system may be either slow-scan or fast-scan, or may feature parallel detection of depth or lateral pixels such as in Fourier-Domain or swept-source OCT.

The experimental apparatus we used for PPOCT is illustrated in FIG. 2A. A femtosecond Ti:sapphire laser ($\lambda_0$=800 nm, $\Delta\lambda$=90 nm) was used as the light source for OCT, and a rapid scanning optical delay line (RSOD) operating at 2 kHz line rate was used for high speed acquisition of OCT A-scans. The source light was pulse-stretched using ~30 m singlemode fiber to reduce the peak intensity of the OCT probe light. The sample was pumped through a dichroic mirror (DM) using second harmonic light from a Q-switched Nd-YAG laser (532 nm, ~50 ns pulse width, 10–50 μJ/pulse, 1 kHz repetition rate, focal spot ~40 μm). A holographic notch filter (HNF) having optical density of 6.0 @ 532 nm and transmittance of ~0.8 @ 800 nm prevented pump light from entering the OCT receiver. A computer-controlled delay generator triggered by the RSOD line sync triggered both the pump laser Q-switch and the synchronized detection electronics. Balanced detection was used to suppress non-interferometric transient absorption of sample arm light.

Figure 3:
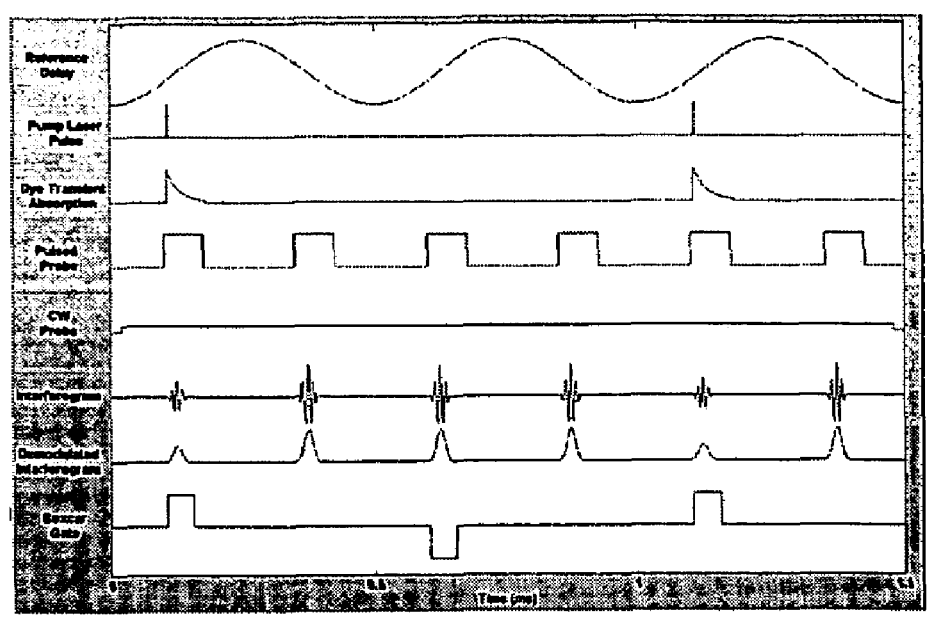
FIG. 3 is a timing diagram for a synchronized pump-probe scheme in accordance with on embodiment of the invention.

The timing sequence used for depth-resolved detection of the transient absorption signal is illustrated in FIG. 3. The resonant scanner of the RSOD generated a sinusoidal reference arm delay at 2 kHz, fast enough so that the entire interferogram resulting from a single reflection in the sample occurred within a single excited state lifetime of the probe molecule. The pump laser was triggered at 1 kHz so as to generate transient absorption in the sample on alternate one-sided A-scans. A boxcar averager was used in baseline subtraction mode to provide the average difference between demodulated interferometric data with the pump on and off. The delay of the pump pulse and the boxcar gate with respect to the reference delay was scanned under computer control to generate pump-probe OCT A-scans. A second boxcar averager provided time-correlated non-differential OCT signals. For the data presented below, the differential and non-differential boxcar signal for each pixel was averaged over 100 pump laser pulses, therefore the acquisition time for 300 pixel A-scans was approximately 30 sec. The differential signal was optimized by adjusting the relative timing of the boxcar gate and the pump laser with respect to the OCT interferogram.

In FIG. 2A, intense light from a pump laser is coupled into the sample via a dichroic mirror (DM), and scattered pump light is prevented from entering the OCT receiver by means of a holographic notch filter (HNF), specified to have low transmission at the pump wavelength. Rejection of scattered pump light is redundantly accomplished by differential detection of the interferometric signal, which rejects the pump light since it is common mode to both detection channels. Electronic signal processing is then implemented to separate the transient absorption component from the rest of the detected signal, resulting in generation of OCT and PPOCT images.

Further respective embodiments are described below.

B.1.1 PPOCT Embodiment for τ<<Pixel Acquisition Time

This embodiment is to be the preferred approach for the detection of contrast agents having nanosecond or microsecond-scale transient absorption lifetimes. The basic concepts are the same for both time-domain and Fourier-domain OCT systems, however the specific implementations vary as illustrated in FIG. 2A and FIG. 2B. Time-domain OCT systems in which the low-coherence interferometric signal is acquired while scanning the reference arm optical delay as a function of time. This approach is illustrated in FIG. 2A, where the reference arm scanner specifically illustrated is a rapid-scan optical delay (RSOD), but it could also be any sort of linear or calibrateable nonlinear path delay scanner.

It is well known that the detected signal in OCT is composed of a so-called DC component arising from reference arm light, a DC component from the sample arm light, and an interferometric component resulting from mixing of returning reference and sample arm light. In the case of PPOCT, the action of the pump laser activating transient absorption in the sample is to modulate the sample arm light reflected or transmitted (in the case of a transmissive OCT system) intensity. This modulation will appear in both the sample arm DC component and the interferometric component of the detected light, typically as a series of regular exponential-decay "blips" on the interferometric signal at the pump laser frequency and with a duration corresponding to the excited-state lifetime. A significant issue in any PPOCT embodiment is the methodology employed to separate the interferometric modulation (which is depth-resolved) from the sample DC component modulation (which is not). For the embodiments illustrated in FIGS. 2A and 2B, differential detection performs this function, as the sample DC modulation is common mode, while the interferometric signal is differential mode. However, differential detection is imperfect given real receiver performance characteristics, and may not be available in alternative interferometer configurations. Thus, a means for extracting the PPOCT signal from the total detected signal is needed.

The detected signal is thus comprised of:
a) The reference DC component (no modulation),
b) The sample DC component modulated by the pump signal (envelope of the pump field, repetition rate $f_p$), and
c) The inteferometric signal modulated by both the pump signal and the Doppler frequency corresponding to the velocity of the moving reference group delay ($f_d$), in the case of time-domain OCT systems. In the case of spectral-domain systems, the frequency shift $f_d$ may be generated by incorporation of a frequency-shifting modulator into the sample or reference arm of the SSOCT or FDOCT interferometer, as illustrated in FIG. 2B. This frequency shifter may by an acousto-optic or electro-optic modulator, as is well known, or alternatively a mechanical chopper.

The desired PPOCT signal will thus be modulated at $f_{pp}=f_d\pm f_p$, where $f_d$ may include higher harmonics of the pump repetition rate depending on the type of pump modulation used (sinusoidal versus pulsed). If the pump is sinusoidally modulated, then the PPOCT signal will be sinusoidally modulated at both $f_p$ and $f_d$ (which is always sinusoidal in the case of Doppler shifting; in the case of acousto-optic and electro-optic modulation, it can be made sinusoidal), and the PPOCT signal can be recovered by a) locking-in to $f_{pp}$, or b) locking-in to $f_d$, then separating baseband (OCT) from modulated (PPOCT) signals, or c) locking-in to $f_p$, then recovering $f_{pp}$. If the pump is pulsed, then recovery of the PPOCT signal is more difficult because the pump modulation now appears at $f_d \pm n f_p$ (n integer), representing the fundamental (pulse repetition rate) and its harmonics. The options here are to a) lock-in to the fundamental as in a) above, which is disadvantageous because all of the energy in the harmonics will be lost, or to b) use a matched-filter approach consisting of: i) mixing the detected signal with a reference pulse-shaped signal (which could be derived from pump, i.e. the output of a photodetector detecting pump, or else synthesized artificially), or ii) approximating the pulse signal with a boxcar shape, or iii) deconvolving in frequency domain.

In the preceeding, it is assumed that "locking-in" refers to electronic mixing of the detected signal with a reference signal at the specified frequency, followed by temporal averaging over an integration time determined by experimental parameters. We point out that an optical version of "locking-in" may also be used to advantage by tuning either the RSOD carrier frequency (if one is used) or alternatively a separate frequency shifter included in the sample or reference arm to the mixing frequency of interest.

A specific example of a contrast agent which would be detected in this manner is rhodamine 6G and its derivatives, which are capable of being conjugated to proteins. The S0–S1 transition would be the pump transition at 530 nm and the S1–S2 transition at 1010 nm would be the probe. Both transitions are fully allowed transitions which have short lifetimes.

This embodiment could also be used to observe two photon absorption. Two photon absorption, is technically not a pump-probe technique, although it is closely related since it also takes advantage of driving population from one eigenstate to another. Two photon absorption is a nonlinear absorption process, where for instance two photons at 1060 nm are simultaneously absorbed by a contrast agent to drive a transition at 530 nm. Using the technique described by Tian and Warren (Tian, P. F. and W. S. Warren, *Ultrafast measurement of two-photon absorption by loss modulation.* Optics Letters, 2002. 27(18): p. 1634–1636) to detect two photon absorption (tpa), where the radiation source is sinusoidally modulated, the tpa signal is detected at the second harmonic of the modulation frequency. The above techniques for sinusoidally modulated absorption would then work equally as well for the tpa signal, where $f_p$ would then be the second harmonic of the modulation frequency. There are a host of contrast agents which could be detected with tpa, including green fluorescent protein, fluorescein, and water soluble quantum dots.

B.1.2 PPOCT Embodiment for τ~Pixel Acquisition Time, Low Duty Cycle Pump

In general, dye species that have the appropriate spin-forbidden transition for this embodiment fall into the class of short intermediate state lifetime contrast agent. The triplet state lifetime is typically on the order of a microsecond. The typical energy level transition scheme of such a dye molecule is shown in FIG. 1, assuming a singlet ground state. In FIG. 1, a simplified energy level diagram for a dye species is shown. Without a pump beam induced triplet state population, the dye will not absorb the probe beam. The pump beam induced triplet state population will absorb the probe beam. Example of such contrast agents include methylene blue and Zinc-conjugated porphyrin compounds. The pump beam is selected to have the appropriate wavelength to excite the dye molecules to make a transition from the ground state to the excited singlet state. The molecules cycle rapidly between the excited and ground state. Once in the excited singlet state the molecule has some probability (quantum yield) of spontaneously crossing over to the triplet (T1) state. As this state is long lived in comparison to the excited singlet state, dye molecules will begin to accumulate in this intermediate state, until a steady-state is achieved.

The probe beam wavelength is chosen so that the probe beam is in resonance with the transition of the dye molecules from the first triplet (T1) to the second triplet (T2) state. If there is no accumulation of dye molecules in the T1 state, the probe beam will not be absorbed during passage through the dye. On the other hand, if the pump beam has created a significant population of dye molecules in the triplet (T1) state, the probe beam will be absorbed during transmission. We note that the addition of a second pump beam tuned to the S1–T1 transition frequency would coherently drive population from S1 to T1. Then modulation of the second pump beam could also serve to modulate the probe beam absorption. The use of the second pump beam would be particularly useful for contrast agents that have poor triplet state quantum yield or where there are multiple states coupling to the S1 state.

In certain situations, the peak pump intensity required for populating of the triplet (T1) state can only be achieved by short pulses, in order to avoid excessive average power that will damage the sample. In these cases where the pump beam can only be turned on briefly, the triplet state lifetime sets the limit in which useful PPOCT signal may be acquired. For many dyes of interest, this duration is ~1 μs, which for common time-domain OCT systems constrains us to acquisition of a single OCT image pixel during a pump cycle. The boxcars and delay generator in the scheme shown in FIG. 2 are for the purpose of selecting the target pixel for acquisition. For spectral-domain OCT systems which acquire complete A-scans in the same time that time-domain systems acquire a single pixel, it is clearly advantageous that a complete A-scan could be acquired during a single pump cycle instead of a single pixel.

Details of the reduction to practice of this embodiment including experimental data acquired with methylene blue contrast agent are to be found in, "Molecular contrast in Optical Coherence Tomography," published in Optics Letters (K. D. Rao, M. Choma, S. Yazdanfar, A. M. Rollins, and J. A. Izatt, "Molecular Contrast in Optical Coherence Tomography using a Pump-Probe Technique," *Optics Letters* 28:340, 2003).

We note that in a situation where the excited state lifetime is significantly longer, or the pump beam could be left on for significantly longer without damaging the sample, or where the OCT A-scan acquisition time was significantly shorter (as is the case with spectral domain OCT systems), the experimental scheme would be significantly simpler. In such a situation, the excited-state lifetime or pump beam duration would be adjusted to be similar to the duration of an A-scan at the probe wavelength. Another A-scan could then be made with the pump off. The difference or averaged difference in the two A-scans could then be used to determine the contrast agent distribution in the sample, using similar data processing and reconstruction approaches as described in the above-referenced manuscript. Such an embodiment would be more efficient than the embodiment in the manuscript as it acquires an entire A-scan of contrast agent distribution information during a single pump cycle as opposed to a single pixel. This scheme will be similar to one described below in section B.1.3

An alternative approach for increasing the efficiency of this PPOCT approach would be to use a probe source which is pulsed with a similar duty cycle as the pump source, as illustrated in FIG. 3. In this situation, the probe pulses would be arranged to coincide with or to follow the pump pulses with a very short time lag (on the order of nanoseconds), with the probe pulses having a multiple of the frequency of the pump pulses. For a frequency multiple of two, the boxcar averaging with baseline subtraction approach could be used directly, resulting in a significant increase in efficiency. The compression of pump source power to a time window that is smaller than $\tau$, ensures maximum signal contrast. In comparison, the use of a continuous wave probe source wastes a large fraction of the probe signal. The contrast change in the sample exists for the duration of $\tau$. Therefore, for a pump duty cycle of T, a scheme based on a continuous wave probe source wastes $(T-\tau)/T$ fraction of the probe light. An attractive source of pulsed probe light for this embodiment would be the output of an amplified, modelocked $Ti:Al_2O_3$ laser whose pulse is stretched to microsecond length by dispersion or a pulse-stretching network. The disadvantage of this approach is the expense of the pulsed probe as compared to conventional broadband sources used in OCT.

B.1.3 PPOCT Scheme for $\tau$>>Pixel Acquisition Time, High Duty Cycle Pump

In addition to the triplet states, certain dye species have other intermediate states which can be significantly longer lived in terms of their decay lifetime. Such species include the fluorescent proteins GFP and DSred, which are widely used as markers of gene expression in microscopy. Both species have dark states which lifetimes are on the order of milliseconds. In the case of GFP, this state occurs through a charge change in the molecule. Long lifetime intermediate states can in principle be achieved by photo-induced isomerization and a host of other mechanisms. Both indocyanine green and vitamin A (retinal) have long lived states due to photoinduced isomerizations. In the case of vitamin A, the isomerization is a crucial step in human vision.

Figure 5:
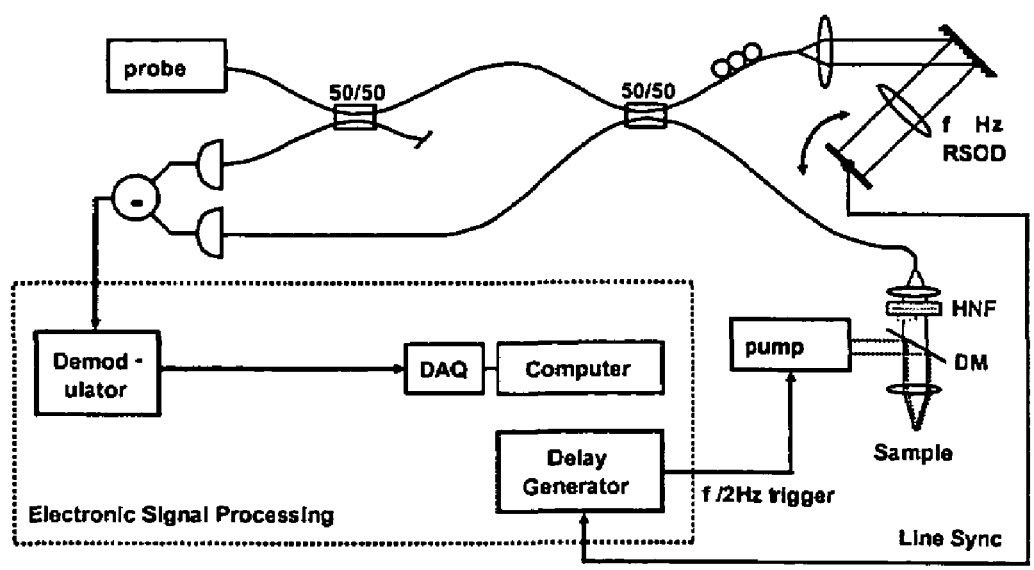
FIG. 5 is an exemplary embodiment of a PPOCT system for A-scan acquisition in accordance with the invention.

The increased efficiency of spectral domain OCT systems allows for much more rapid signal acquisition with comparable signal quality to time-domain systems. In particular, SSOCT system pixel acquisition times may be of the order of nanoseconds, while both SSOCT and FDOCT A-scan acquisition times may be of the order of microseconds. The long lifetime of the intermediate state or the use of spectral domain OCT systems which allow for much more rapid signal acquisition allows for a simplified PPOCT embodiment (see FIG. 5 for the time-domain embodiment; the spectral domain embodiment is the same as in FIG. 2B). In this situation, two groups of pixels, A-scans, groups of A-scans, or images are acquired where the pump beam is alternately switched on and off for subsequent acquisitions. The difference or averaged difference of the data acquired with the pump on versus off is then processed to reveal the contrast agent distribution in the sample.

Another scenario for which this embodiment would give advantage would be if the A-scan duration were purposefully reduced to be less than the intermediate state lifetime of even shorter-lived states such as singlet or triplet states. Array detection approaches such as Fourier-Domain OCT, or ultra-fast scan techniques such as an RSOD based on acousto-optic scan technology, could potentially be designed to fit this criterion. This embodiment is especially appropriate for use with spectral domain OCT approaches including Fourier-Domain and Swept-Source OCT, which allow for A-scan acquisition up to several orders of magnitude faster than the conventional time-domain approach.

This method is also very suitable for use with certain proteins that can reversibly switch between 2 different absorption states with the use of illumination at specific wavelengths. Examples of such proteins are phytochrome A (phyA) and bacteriorhodopsin.

Figure 5A:
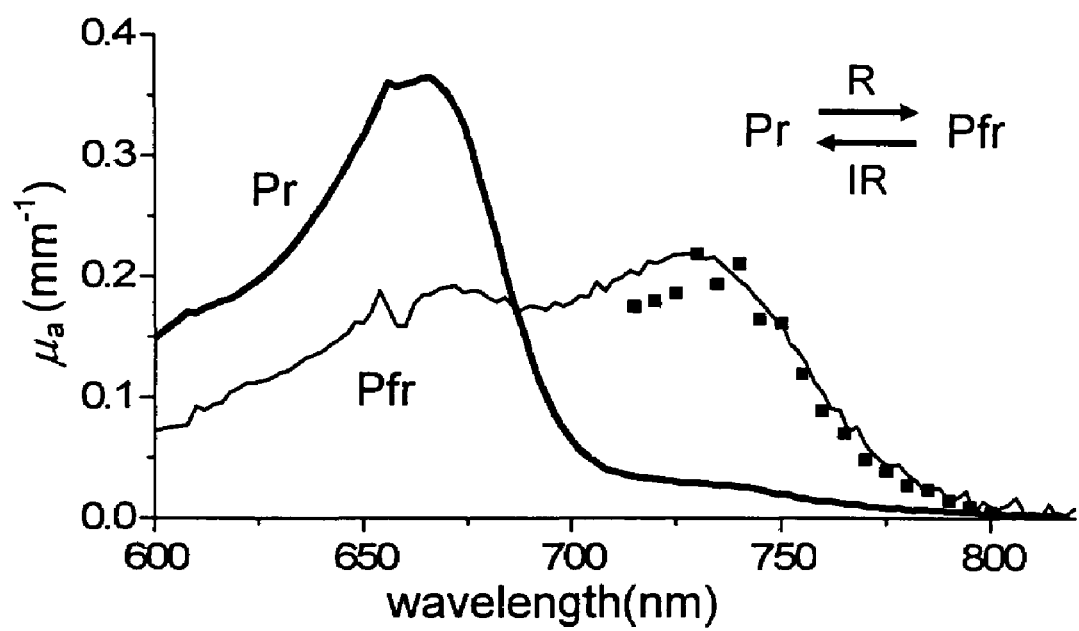
FIG. 5A is a graph of the absorption spectra of 83 µM PhyA.

As a demonstration of the method's capability to image such proteins, we have chosen to perform an experiment with phyA. The dynamics and properties of the two states of PhyA (Pfr and Pr states) are summarized in FIG. 5A. The molecules can be made to transit from one state to the other by illumination with light which wavelength matches the absorption maximum of the initial state.

The imaging strategy we adopted for phyA is based on acquiring OCT scans at 750 nm while switching the molecules between their two states. To this end, we kept a 750 nm OCT probe beam on the sample during the entire imaging process; in the absence of other illumination, phyA would be in its Pr state. The image acquisition process involved the following steps: A) the 660 nm illumination was switched on, B) after a pause of 500 ms to allow time for phyA to transit into its Pfr state, an averaged Pfr A-scan was acquired, C) the 660 nm light was turned off, D) after a pause of 500 ms to allow phyA to transit into its Pr state, an averaged Pr A-scan was acquired, E) the sample was displaced laterally and the process was repeated. The difference of the two A-scans revealed the distribution of phyA within the sample.

B.1.4 PPOCT Scheme for $\tau$~Infinity, Permant Altering of Contrast Agent

For contrast agents where the agent is permanently altered by photodestruction, isomerization, oxidation/reduction, or produces long lived photoproducts by reaction with endogenous molecules, the data must be acquired once before and once after the sample has been exposed to the pump radiation. By permanent, we mean that for the image acquisition time the probability of the molecular system of returning to the original state is practically nil. In principle the data could be gathered by pixel, line, or entire image, however in order to reduce the effect of diffusion of both the pump photons and photoproducts through the tissue, it is most efficient to acquire entire images at a time.

This embodiment is an analog of the fluorescence recovery after photobleaching (FRAP) method used in fluorescence microscopy, hence similar physical properties may be derived from the results. For instance if the pump-probe cycle is repeated over a period of time, the diffusion rate of the contrast agent in and out of the image Window may be determined. The major advantages over FRAP are depth resolution and the fact that the contrast agent need not have an excited state which fluoresces. Molecules with flourescent states are a fairly uncommon phenomena in biologically relevant environments.

B.1.5 PPOCT Temporal Resolution for Interrogation of Contrast Agent Environement Any of the pump-probe techniques described thus far can also be used to temporally resolve the pump-probe interaction with the molecular system. The addition of a variable temporal delay line to vary the time between the pump and probe beams is the only hardware addition required. Then by systematically varying the pump-probe delay and monitoring the contrast as a function of delay one can map the exponential decay of the molecular system back to its ground state. Fitting the exponential decay, likely to multiple exponentials, will yield information about the molecular system, including the number of states which are decaying back into the ground state and the natural lifetimes of these states. Both of these molecular properties are well know to vary based upon interactions of the molecule with its environment.

The depth resolved lifetimes then provide a 3D map of the local environment of the contrast agent.

B.2 Saturable Absorber Based Molecular Contrast OCT (SAOCT)

Another class of molecular contrast OCT that we would like to describe here involves the use of saturable absorbers as contrast agents. Saturable absorbers are generally (but not limited to) chemical species that become progressively more transparent as the intensity of incident light increases.

Figure 6:
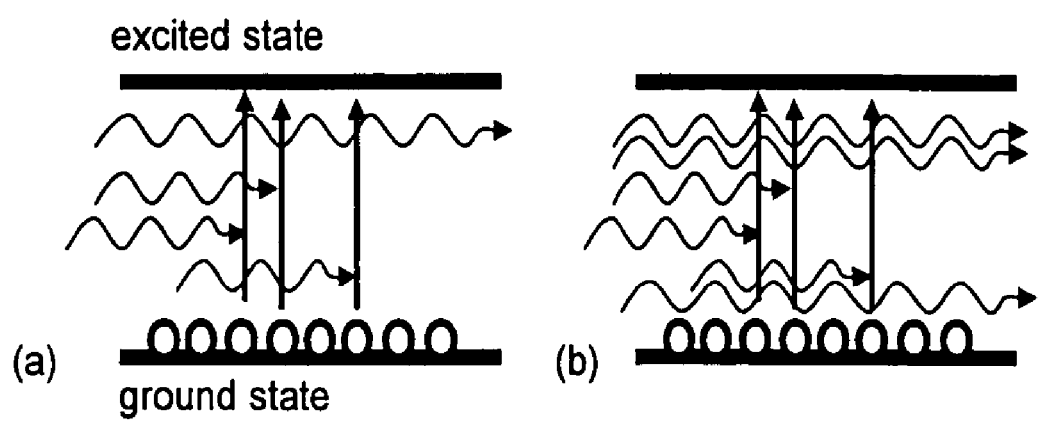
FIG. 6 is a simplified energy diagram for a saturable absorber dye species.

The phenomenon can be readily understood from an energy levels argument. Photons with energy quanta that match the energy difference of the ground and excited state of a chemical species may be absorbed by the chemical species in order to make the transition to the excited state. The number of such chemical molecules is finite in a given volume. As such, there is a maximum number of photons per unit time (saturation intensity) that can be absorbed by the absorbers. This limit is a function of the relaxation time and the number of molecules in the excitation volume. When the incident light intensity approaches or surpasses this limit, the fraction of light (transmittance factor) that is transmitted increases (see FIG. 6). In other words, the sample becomes more transparent.

This nonlinear dependency of transmitted light intensity on input light intensity in saturable absorbers can be exploited in combination with OCT to determine the location and concentration of saturable absorbers in a sample, since other factors which affect attenuation such as scattering processes and non-saturable absorption are independent of the input light intensity. (Note that all absorbers are saturable given a high enough input light intensity. Our classification of saturable absorbers includes chemical species that can be saturated at low enough input intensity that they would not be destructive of biological or other relevant samples.) The relatively short singlet excited state relaxation lifetime ($\sim 10^{-6}$ to $10^{-12}$s) requires the use of mode-locked lasers to achieve a high enough intensity in order to approach or exceed the saturation intensity. In the ensuing description, wherever a laser is mentioned, we implicitly mean a mode-locked laser which is capable of putting out a train of short ($\sim 10^{-6}$ to $\sim 10^{-15}$ s) light pulses.

Herein are disclosed three embodiments for taking advantage of saturable absorption for molecular contrast in OCT. An advantage of these methods is the use of a single light source to provide molecular contrast; in effect, the single light source acts as both pump and probe. The first uses polarization contrast to separate pump and probe beams at the same wavelength (section B.2.1). Alternatively, the pump and the probe may be sufficiently detuned in wavelength from each other to be spectrally distinguishable, but remains sufficiently in resonance to the excitation transition (also included in section B.2.1). The next two embodiments do not distinguish between a pump and a probe beam, and instead used a single input beam as the input to the target. The first of these embodiments is a simple time-domain approach, where the attenuation of pulses of differing intensity are observed and compared directly by using a novel pulse-stretching idea to rapidly switch between high and low pump intensity (section B.2.2). The second uses a frequency-domain approach to monitor nonlinearity in OCT beam attenuation as a function of intensity (section B.2.3).

B.2.1 Polarization and Spectral Encoding Embodiments

Figure 7:
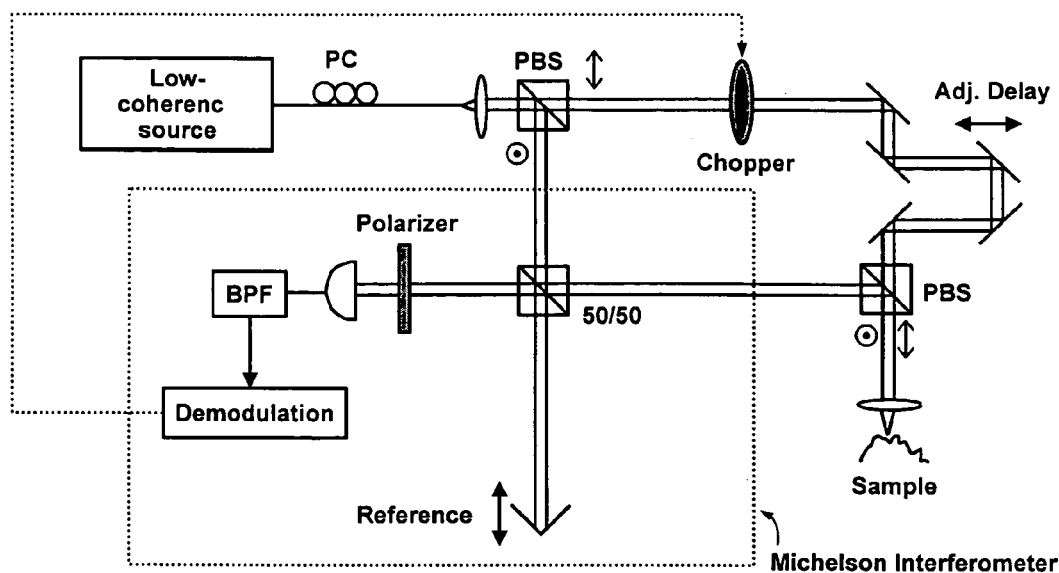
FIG. 7 is a block diagram of a PPOCT system for achieving molecular contrast with a single light source.

A schematic for achieving molecular contrast with a single light source is shown in FIG. 7. In this scheme, a polarization beam splitter (PBS) is used the separate orthogonal polarization states of the input light, one of which is treated as the pump beam and the other as the probe. Since both beams are at the same wavelength, absorption of the pump beam saturates the absorption of the probe beam. A variably birefringent medium (e.g., waveplates or optical fiber) may be used to control the relative amplitudes of the pump and probe. The probe beam is delivered into a conventional time-domain or spectral-domain OCT interferometer, and is recombined with the pump beam prior to being incident on the sample. Along with the polarizing beam splitter near the sample, a polarizer (PC) in the detection path provides isolation of the pump from the probe. FIG. 7 illustrates the method using a time-domain OCT system, although clearly either spectral domain approach may equivalently be used.

In order to provide molecular contrast, a differential measurement is taken with one of two methods. In one possible configuration, a chopper may be used to modulate pump amplitude at alternating pulses or alternating OCT line scans. Amplitude modulation of the pump beam facilitates signal detection and acquisition. In another configuration, a variable delay of the pump beam may be used to perform a differential measurement. If the delay is adjusted such that the pump and probe are overlapping, saturable absorption occurs. On the other hand if the probe arrives long after the pump, the molecules have relaxed to the ground state and are able to absorb the probe. Alternating between these two states is analogous to switching the pump on and off. The adjustable delay provides the additional flexibility to optimize, with respect to the lifetime of the chemical species, the arrival time of the probe after the pump.

One disadvantage of this configuration is that the polarization states of the pump and probe may not be maintained, due to birefringence or optical activity within the sample. Another drawback is that excitation of the sample with a polarized light source selectively excites the fluorophores with absorption dipole moments parallel to the pump electric field. Thus, in order for the excited molecules to interact with a probe that is oriented orthogonal to the pump, the probe must arrive after rotational diffusion has reduced the anisotropy within the medium.

Figure 8:
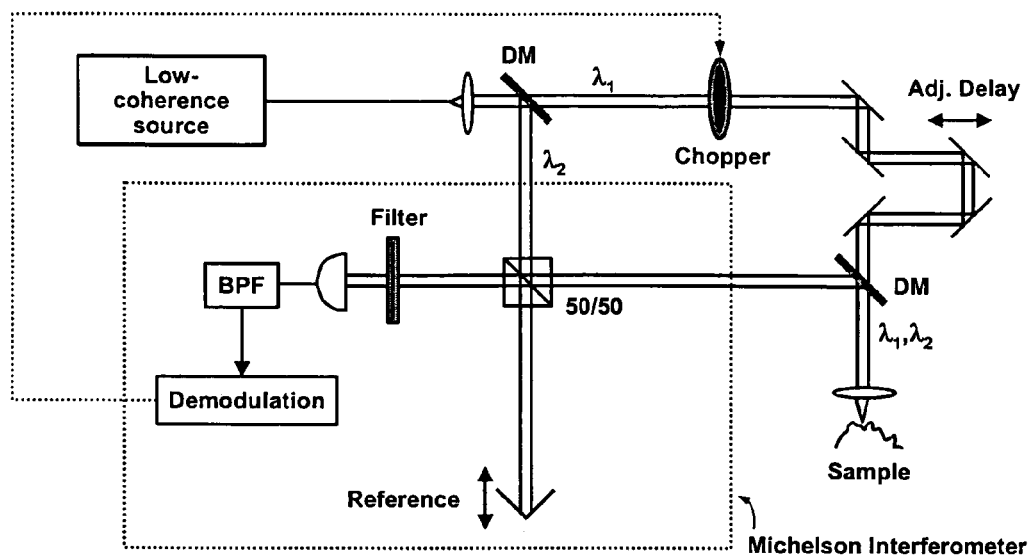
FIG. 8 is a block diagram of a PPOCT system for achieving molecular contrast with different spectroscopic components of a single light source.

A simple modification of this configuration, shown in FIG. 8, circumvents this problem. Once again a single source is used as both pump and probe. However, instead of using orthogonal polarization states, different spectral components within the source optical bandwidth are used as the pump and probe. The polarization beam splitters are replaced with dichroic mirrors, and the polarizer is replaced with a filter. The dichroic mirrors select a region of the input spectrum as the pump and the rest as the probe. In this case, distortion of the incident pulses in the time domain may have to be considered. The detection scheme remains identical to the above configuration.

B.2.2 Pulse Stretching Approach

As previously stated, the phenomenon of saturable absorption requires that radiation be delivered to a dye doped sample in short ($10^{-6}$ to $10^{-12}$ s) pulses. The intensity of a radiation pulse is directly proportional to the quotient of the number of photons in the pulse, N, and the temporal duration of the pulse, $\Delta t$. It is instructive to look at the delivery of a light pulse as a stream of N photons delivered over $\Delta t$ seconds with a mean photon inter-arrival time $\delta t$ of $\Delta t/N$. If $N/\Delta t$ is in the saturation regime, $\delta t$ is small, and earlier arriving photons are more likely to be absorbed by the dye than later arriving photons are. In other words, the earlier photons induce transparency which is detected by later arriving photons. This is a system that exhibits memory because the absorption of the $i^{th}$ photon is a function of i itself. In fact, the absorption coefficient is a decreasing function of i, and the mean absorption cross section of the dye over i photons is less than the baseline absorption cross section.

If instead the same N photons are delivered over $\Delta t'$ seconds, where $\Delta t'>>\Delta t$, $N/\Delta t'$ is well below the saturation regime, and $\delta t$ is large. Earlier photons are just as likely to be absorbed as later photons, and the system is memoryless. The absorption cross section is independent of i, and the mean cross section over i photons is equal to the baseline absorption cross section.

Given that the $\Delta t$ of a pulse can be manipulated by propagation of a light pulse through a medium (e.g. optical fiber) or optical systems (e.g. femtosecond pulse shaper) with nonzero second order dispersion characteristics, we propose a method to measure the concentration of a saturable absorber by recording the intensity of coherently gated backreflected sample light $I_{OCT}$, as a function of $\Delta t$. Since the manipulation of $\Delta t$ has either a negligible or well-characterized effect on N, and since scattering processes are non-saturable, a straightforward relationship between $I_{OCT}$, $\Delta t$, and saturable absorbable concentration can be established.

Figure 9A:
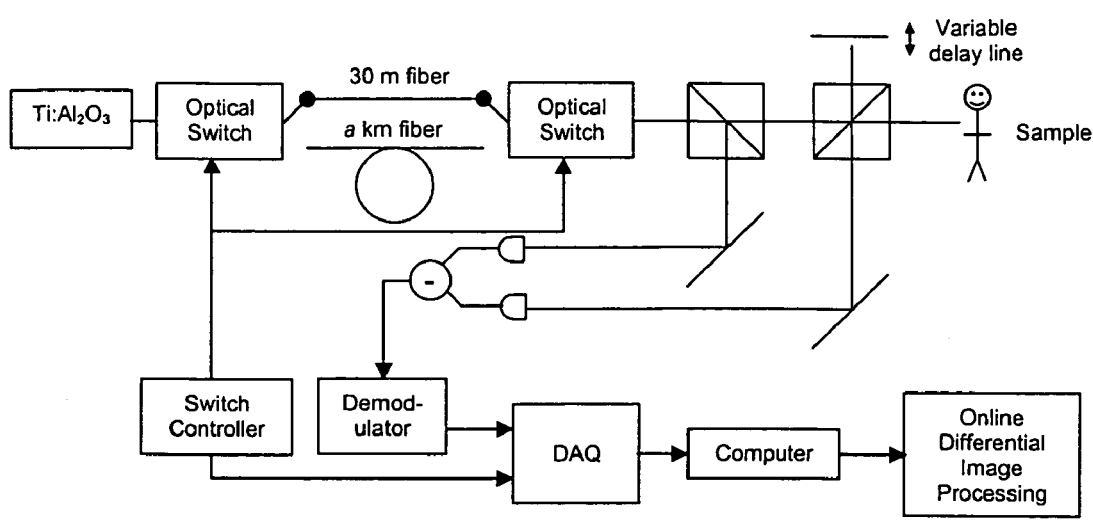
FIG. 9A is a block diagram of a SAOCT system for acquiring depth-resolved concentration profiles of a saturable absorber.
Figure 9B:
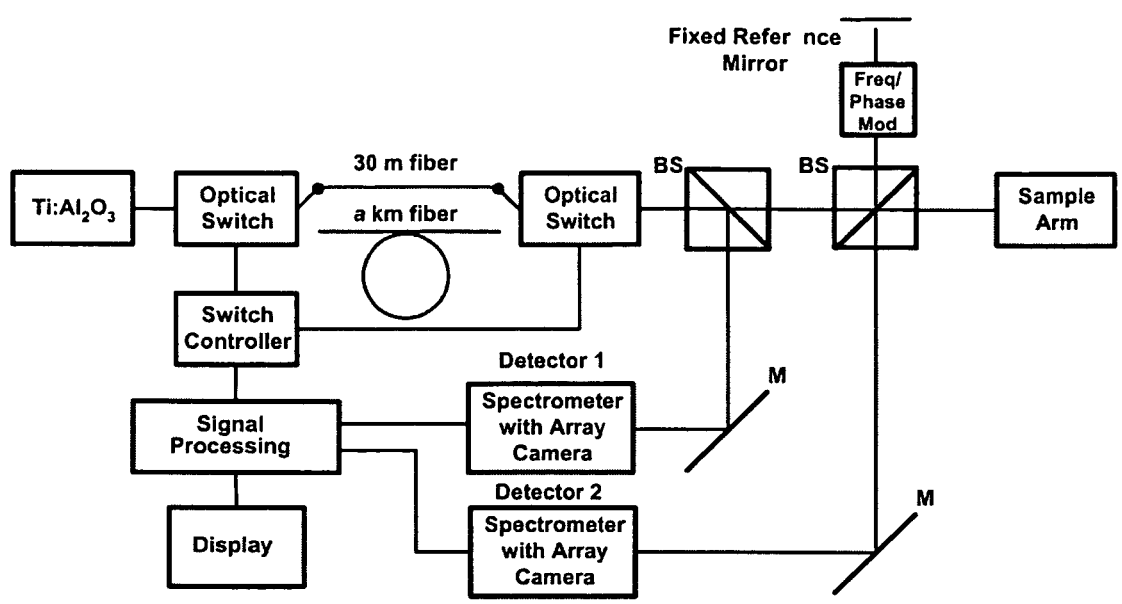
FIG. 9B is a block diagram of a FDOCT system for acquiring depth-resolved concentration profiles of a saturable absorber.

One particular embodiment of this concept is to perform OCT scans on a sample containing a saturable absorber with a pulsed laser source that is broadened with a dispersive medium or other optical system on alternate OCT scans (FIGS. 9A and 9B). In this embodiment, pulse broadening is achieved by passing the pulsed output of a Ti:Al$_2$O$_3$ laser through a km of fiber. Note that any pulse broadeneing material, system, or device can be interchanged with the a km of fiber. The intensity of non-dispersed pulses has width $\Delta t$ and has an intensity in the saturation regime. a is chosen so that the dispersed pulse width $\Delta t'$ brings the pulse intensity below the saturation regime. Because both switched paths are greater than or equal to 30 m, nonlinear pulse broadening in both paths are matched. The total integrated energy of the non-dispersed and dispersed pulses are either equal or related by a constant of proportionality, K, characteristic of the dispersive system utilized (in this case, the attenuation of the pulse through a km of fiber). The non-dispersed and dispersed pulses yield coherence-gated backreflectivity profiles of y(x) and y'(x), respectively. The depth-resolved concentration of the saturable absorber is proportional to y(x)−K*y'(x). The scaling of y'(x) by K is acceptable under the assumption that $\Delta t'$ is sufficiently long for absorption to be in the linear regieme. Alternately, a broadband amplitude filter can be placed in the non-dispersed path to match the attenuation in the dispersed path. In this situation K=1.

Since the saturation intensity is a function of the excited state lifetime of the saturable absorber, it should be noted that the excited state time lifetime can be extracted by examining backreflectivity profiles at several values of $\Delta t$. This feature may be of particular value in characterizing the microenvironment of contrast agents (whose lifetime can be dependent on pH, ionic concentrations, gas partial pressures, and other analyte concentrations), or even potentially quantifying the concentration of multiple simultaneous contrast agents through exploitation of this additional degree of freedom.

As in the previous section, the benefits of this invention are independent of the type of OCT system used, either time-domain or spectral domain. FIG. 9B illustrates the pulse stretching approach to SAOCT using a Fourier-domain OCT system.

B.2.3 Amplitude Modulation SAOCT

Figure 10:
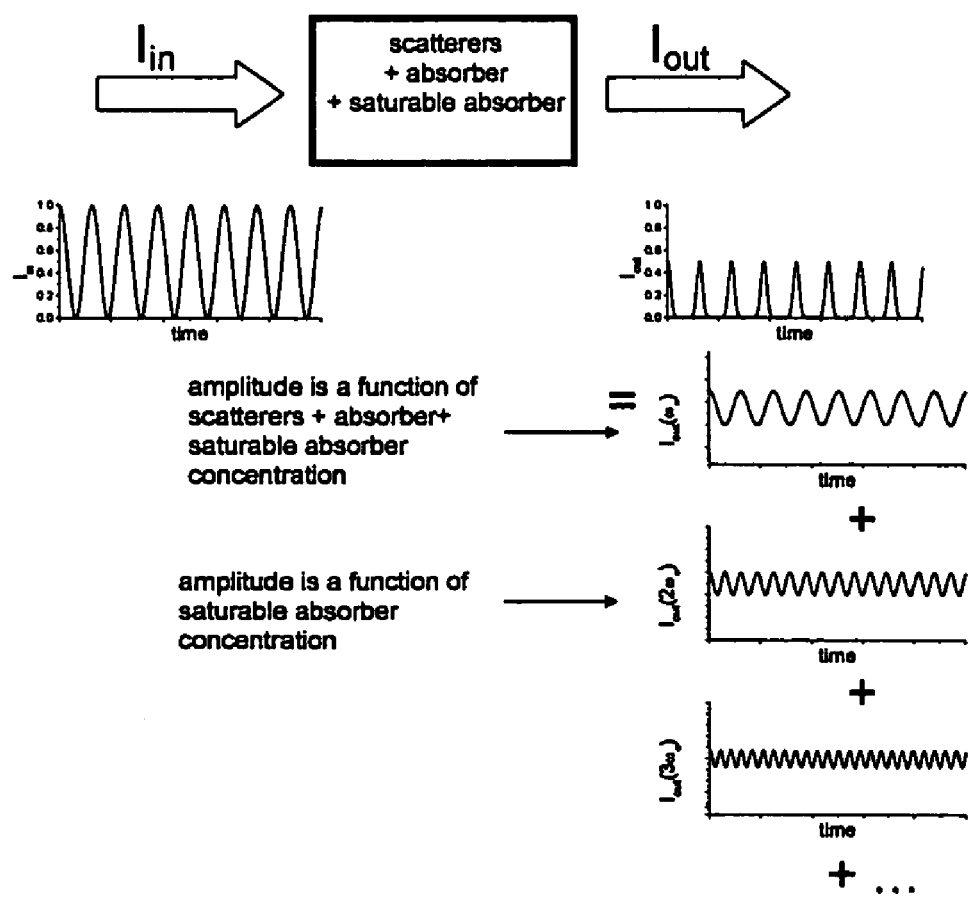
FIG. 10 is a sequence diagram of a method for isolating saturable absorber contribution.

An alternate scheme for isolating saturable absorber contribution in a sample that includes other absorbers and scatterers is depicted in FIG. 10. In this situation, a laser beam with a sinusoidal amplitude modulation is used. In theory, the modulation period is unimportant; though, in practice, we would want the period to be sufficiently short to isolate the modulation frequency from other noise sources such as electronic and 1/f noise. If saturable absorbers are present, the transmission will not be sinusoidal as the sample will appear more transparent when the input intensity is high. By measuring the signal and performing a Fourier decomposition on the signal, we can extract various frequency components in the signal. The signal referred to here is the photodiode current in the case of time-domain or SSOCT sytems, or the signal detected on each pixel of the array detector in FDOCT systems. The reason for performing a Fourier decomposition lies in the practical ease by which such decomposition can be performed to characterize the signal deformation. The amplitude of the first component is a function of all attenuation contributions. The amplitudes of higher order components are solely generated by the nonlinearity of the saturable absorber concentration. As the second component is generally the greatest in amplitude, determination of the saturable absorber concentration can be easily done by gating the raw signal at twice the modulation frequency and determining the amplitude of the resulting signal component.

The same principle has been exploited to study 2-photon absorbers (Tian, P. F. and W. S. Warren, *Ultrafast measurement of two-photon absorption by loss modulation*. Optics Letters, 2002. 27(18): p. 1634–1636).

Figure 11:
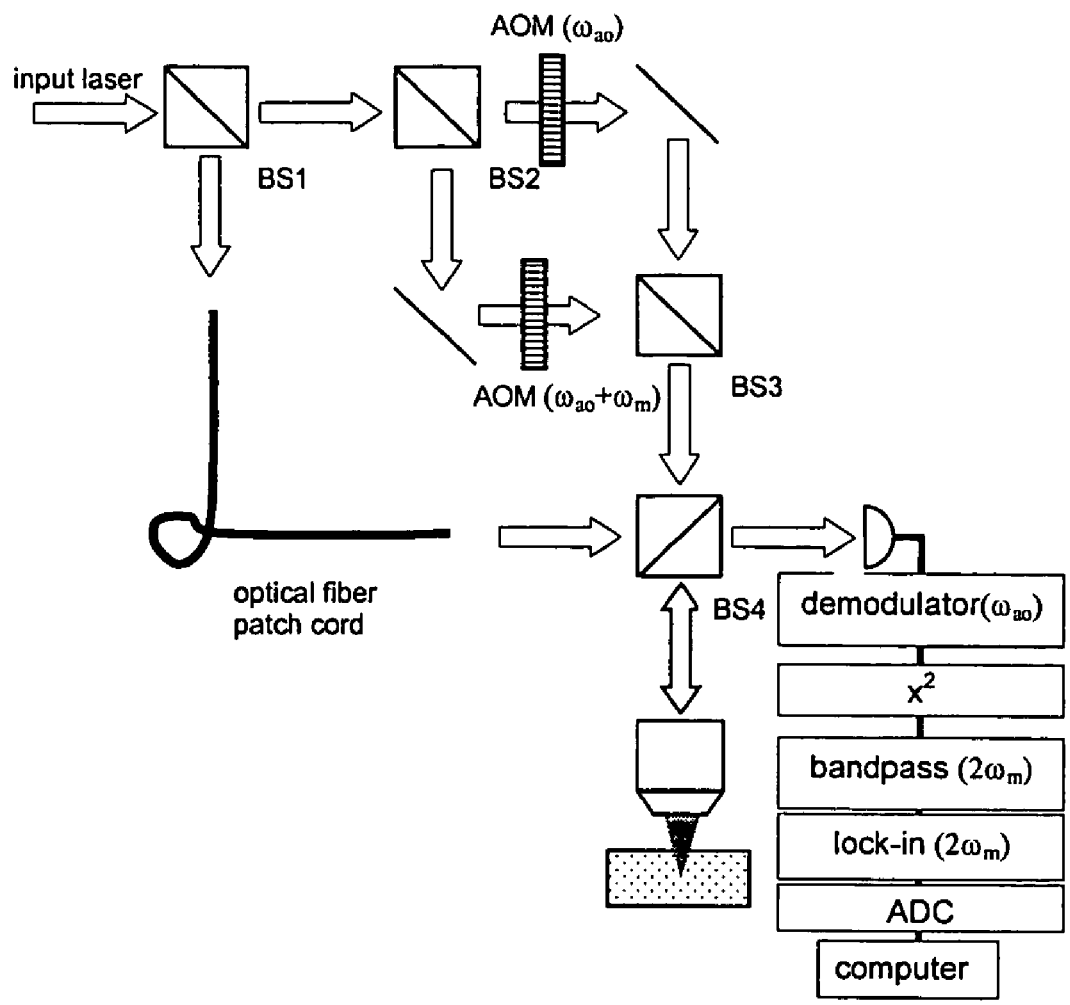
FIG. 11 is a block diagram of SAOCT system for rendering depth resolved saturable absorber concentration contrast in a sample.

We propose a SAOCT scheme, based on this principle, to render depth resolved saturable absorber concentration contrast in a sample. The scheme is depicted in FIG. 11. The exiting beam from BS3 is amplitude modulated at $\omega_m$ and optical frequency upshifted by $\omega_{ao}$. (For our purpose, we choose $\omega_m$ (~10 kHz)<<$\omega_{ao}$ (~100 MHz). This simplifies the signal processing.) This beam is channeled to the sample; the reflection is collected and recombined with a unshifted and unmodulated reference beam channeled through the optical fiber patch cord. If the optical path of the first beam matches with the second, a doubly amplitude modulated signal at $\omega_m$ and $\omega_{ao}$ results. If the paths are unmatched, there will only be an amplitude modulation at $\omega_m$. We demodulate the signal at $\omega_{ao}$, square the result and bandpass the product at $2\omega_m$. This leaves a signal at $2\omega_m$ when the optical paths are matched and no signal otherwise. The amplitude of the signal is a function of the saturable absorbers concentration and its depthwise distribution. We note that this is an embodiment but not the only possible embodiment of a SAOCT system.

This system will be able to render depth resolved images with saturable absorber distributions. The saturable absorber may be intrinsic to the sample or externally introduced and preferentially taken up by specific regions of the sample. Saturable absorbers species with different absorption spectra may be selectively probed by judicious selection of appropriate excitation wavelengths.

The major advantage of such a molecular contrast scheme lies in the fact that all absorbing chemical species are appropriate candidates for contrast. The choice of saturable absorbers to exploit for use depends only on the wavelength and the intensity of light available.

B.3 Molecular Contrast Based Refractive Spectrum OCT

Figure 12A:
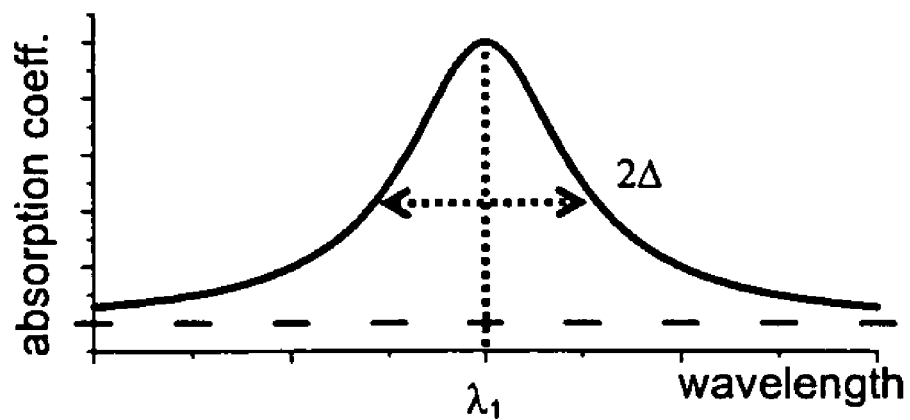
FIG. 12A is an exemplary absorption spectrum of a molecular contrast agent.
Figure 12B:
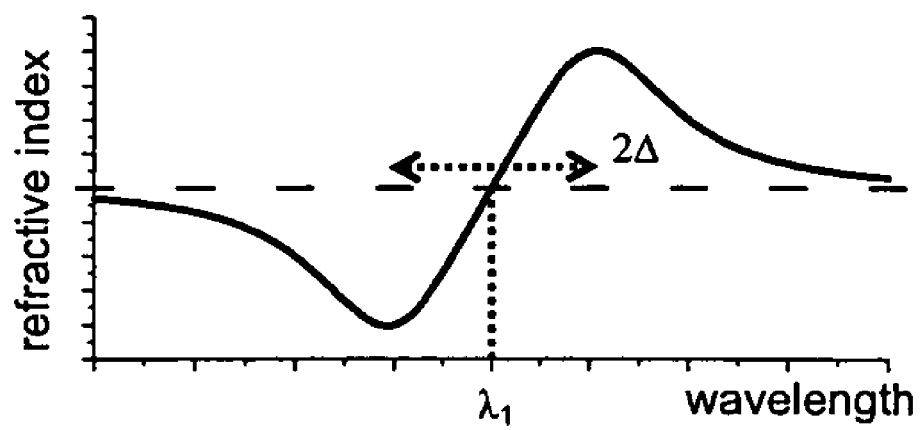
FIG. 12B is a refractive index spectrum related to the absorption spectrum depicted in FIG. 12A.

The methods described thus far, are all based on measuring changes in the collected light intensity for contrast. The absorption spectrum (FIG. 12A) is related to the spectral refractive index (FIG. 12B) variation by the Kramers-Kronig relationship. This relationship opens up the possibility for extracting contrast information through measurements of refractive index changes.

The Kramers-Kronig relationship can be applied to calculate the spectral refractive index variation from the absorption spectrum. In the case of a Lorentizan (in frequency space) absorption spectrum with a maximum at $\lambda_1$ and a linewidth of $2\Delta$, the refractive index profile possesses stationary points at wavelengths $(\lambda_1-\Delta)$ and $(\lambda_1+\Delta)$ (see FIGS. 12A and 12B).

The primary advantage of using refractive index based OCT approaches lies in its sensitivity. Such methods may potentially see changes that will not otherwise be revealed in absorption based measurements. In addition, it is highly sensitive to contrast agents that have a broad absorption spectrum, such as GFP (green fluorescent protein). In comparison, intensity based approaches may have difficulties distinguishing a contrast agent with a broad absorption spectrum in the midst of other contrast agents.

B.3.1 Refractive Index Based PPOCT (RIPPOCT)

A possible implementation for refractive index based contrast measurements may follow the image acquisition sequence as those described for PPOCT. For this measurement modality in a time-domain system, the probe wavelength should be detuned from the absorption maximum by either $-\Delta$ or $+\Delta$, so that it is centered on a refractive index maximum or minimum. This detuning is unnecessary for a Fourier-domain system, since the entire waveform in FIGS. 12A and 12B may be resolved using a short time Fourier transform.

In view of the smallness of the absorption change, the refractive index change will likely be small too. In general, for time-domain OCT based phase measurement requires the use of a referencing method. This is necessitated by the fact that any slight unaccounted movement within an OCT system will create phase errors. Several phase based OCT techniques exist that we can exploit to make correct phase measurements.

Figure 13:
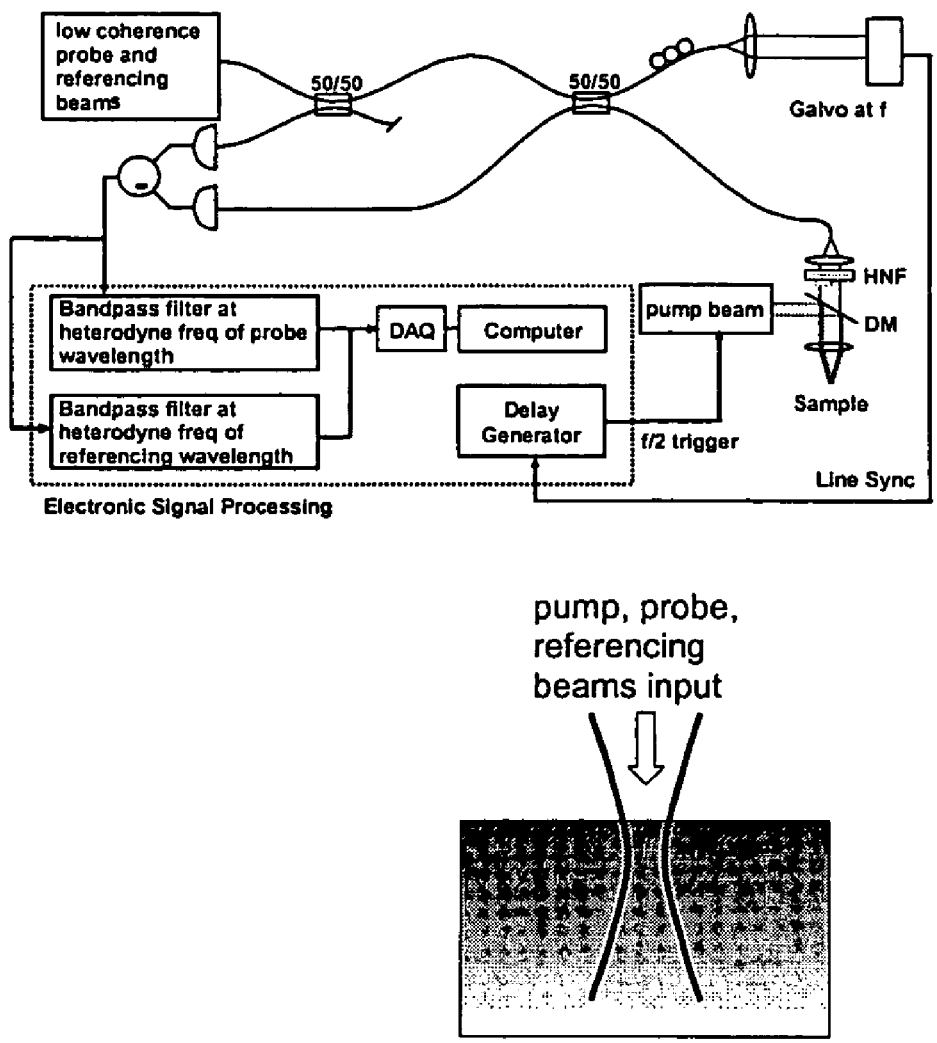
FIG. 13 is a block diagram of a RIPPOCT system based on a third wavelength referencing beam.

One possible implementation of RIPPOCT involves the use of a third wavelength as a referencing source. A RIPPOCT scheme based on the use of long intermediate state contrast agents is shown in FIG. 13. An extension of the scheme for use with short intermediate state contrast agents simply involves incorporating the necessary boxcar selector or other means to enable phase measurements on a short time scale. In the present scheme, the pump, probe and referencing beams are superposed and focused into the sample. The pump is switched on at the beginning of alternate A-scans. The heterodyne signals associated with the referencing and probe wavelength are separated through the bandpass filters and processed to extract their respective heterodyne phase. The difference in the phase lag between the two wavelengths when the pump is switched on and off can then be used to calculate the refractive index change in the sample.

The choice of the referencing beam wavelength is constrained by two considerations. First, it should be chosen to fall beyond the wavelength range where the Kramers-Kronig relationship predicts a refractive index variation. Second, the wavelength should ideally be harmonically related to the probe beam wavelength. By fulfilling this requirement, the system will be significantly more insensitive to vibrational errors in the system. The justification for this can be found in Ref. (Yang, C. H., et al., *Phase-dispersion optical tomography*. Optics Letters, 2001. 26(10): p. 686–688).

The scheme includes the use of a low coherence referencing beam. This need not necessarily be the case. The referencing beam can be a monochromatic beam. In this situation, the heterodyne phase associated with the referencing beam will be due entirely to the averaged reflection from the sample (Yang, C., et al., *Phase-referenced interferometer with subwavelength and subhertz sensitivity applied to the study of cell membrane dynamics*. Optics Letters, 2001. 26(16): p. 1271–1273). In this case, the referencing beam heterodyne phase signal will vary uniformly as we scan into the sample; it is equivalent to an optical ruler by which phase variation in the probe beam heterodyne phase signal can be compared against. Such a scheme for comparing phase lag is equally applicable in this technique.

The second class of RIPPOCT involves the use of a Wollaston prism to separate the probe beam into two spatially separated component (they have orthogonal polarizations) (see FIG. 14) (Hitzenberger, C. K. and A. F. Fercher, *Differential phase contrast in optical coherence tomography*. Optics Letters, 1999. 24(9): p. 622–624). We superpose the pump beam on one of the components (assign this as the probe beam and the other as the referencing beam). We again acquire simultaneous A-scans of the probe and referencing beam and compare their phases. The pump is switched on at the being of alternate cycles. Differences in phase lags with the pump switched on and off can then be used to calculate refractive index changes.

B.3.2 Refractive Index Based SAOCT (RISAOCT)

Figure 14:
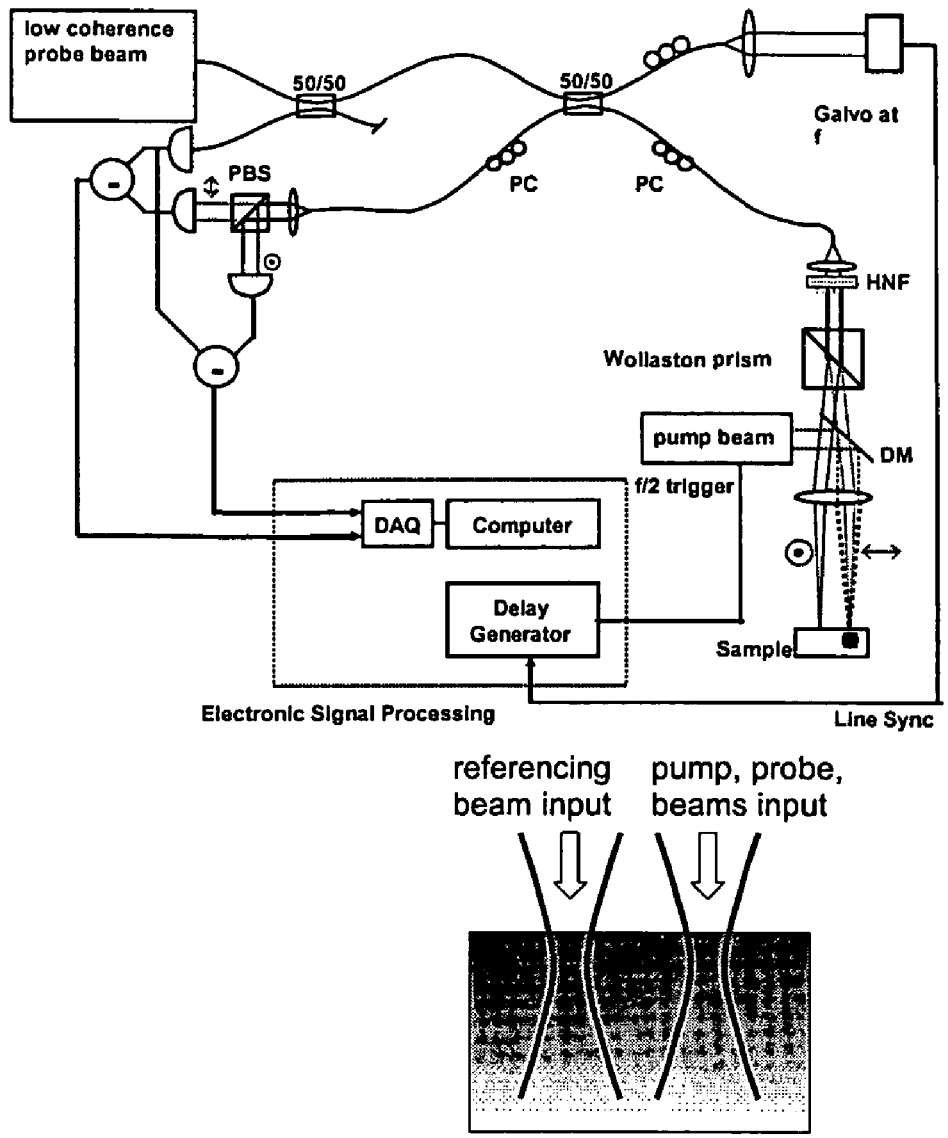
FIG. 14 is a block diagram of a RIPPOCT system based on a displaced referencing beam.

A refractive index based method for measuring saturable absorber concentration can be implemented in a scheme similar to the ones depicted in FIG. 13 and FIG. 14. In this situation, we would choose the pump wavelength to be close or equal to the maximum absorption wavelength. The probe beam is selected to be detuned from the absorption maximum by either $-\Delta$ or $+\Delta$. Referencing beam wavelength choice is dictated by the constraints listed above. Detection and processing is the same as described above.

B.4 Photon Mixing for Molecular Contrast in OCT

There are a number of nonlinear optical processes which may be used for molecular contrast that fall under the general title photon mixing, including second harmonic generation (SHG), third harmonic generation (THG), sum frequency generation (SFG), and difference frequency generation (DFG). The uniting theme is that they all are processes where two or more photons are mixed in a nonlinear optical medium to generate a photon of different wavelength, i.e. $1/\lambda_f = \Sigma 1/\lambda_i$, where $\lambda_f$ is the resulting wavelength and the sum is over all photons involved in the mixing process with wavelength $\lambda_i$. Note that any $\lambda_i$ can go into the above equation with a negative sign, when DFG is being considered. Second, third, fourth, etc. harmonics are those where all $\lambda_i$ are equivalent, where as in SFG and DFG the photons need not be degenerate hence all of the harmonics are special cases of SFG.

Photon mixing is a nonresonant process, i.e. there need not be any excited state molecular resonances for it to work, as is required in PPOCT. This fact loosens the requirements on the wavelength of the light source. Though one should note that, it is well known that near molecular resonances can enhance the nonlinear optical response of a material by orders of magnitude. This property may be exploited to record the spectrum of a contrast agent. Consider a two photon mixing process, where one photon source is narrow bandwidth and one light source is broad bandwidth as is appropriate for OCT. Scanning the narrow bandwidth source in wavelength while recording the photon mixing OCT signal will map out the depth resolved spectrum of the contrast agent, due to the resonant enhancement. Moreover, the recorded spectrum will have the bandwidth resolution of the narrow bandwidth source.

Figure 17:
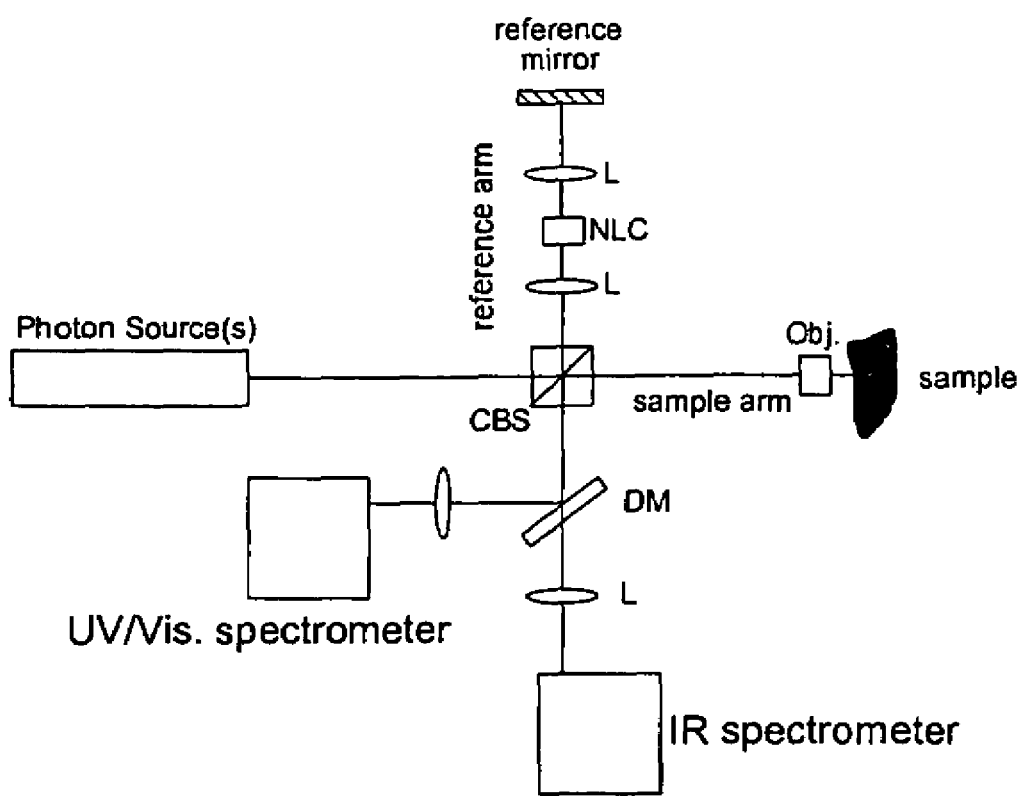
FIG. 17 is a block diagram of a system for Fourier-domain photon mixing OCT.

A generalized experimental setup for Fourier-domain photon mixing OCT is shown in FIG. 17. When multiple photon sources are used, they need to be synced, so that the different wavelengths arrive at the nonlinear material at the same time. The interferometer depicted in FIG. 17 is a free space interferometer, however we note that it is possible to build a fiber based system using either photonic crystal fiber, which can carry all of the wavelengths involved, or by using a fiber for each wavelength and dichroic mirrors to overlap them on the sample. Light exiting the photon source(s), proceeds through a cube beam splitter (CBS). Some percentage of the light goes to the reference arm where the light is focused via a lens (L) through one or more nonlinear crystals (NLC) and then recollimated by a second lens (L) before striking the reference mirror and retracing the optical path. The sample arm light passes through an objective lens (obj) before striking the sample, where the sample mixes the light and reflects it back through the optical path. The light recombined on the detector side of the beam splitter is then filtered by a dichroic mirror (DM), sending the light due to mixing to the UV/V is spectrometer and the infrared light to the IR spectrometer. The DM is used so that a traditional OCT image may be obtained in parallel to the photon mixing OCT image.

To demonstrate photon mixing based MCOCT, we have constructed an SHG-OCT system. We used a time domain system, which had the layout as in FIG. 17, with the following exceptions. The spectrometers were replaced by photodiodes and the interferometric signal was demodulated on a lock-in amplifier. The reference mirror was a retroreflector attached to a scanning galvanometer. The nonlinear crystal generated 529 nm light from a 1058 nm light source. In the sample arm, the sample generated the 529 nm light with a magnitude which was proportional to its nonlinear optical response. The nonlinear response varies for different contrast agents or endogenous molecules, thereby generating the molecular contrast in the resulting image. Collagen was used as the initial contrast agent in a sample of fish skin, where collagen is a major component of the fish scale.

Other suitable contrast agents are the proteins bacteriorhodopsin and green fluorescent protein, which have been shown to have substantial nonlinear response.

B.4.1 Polarization Resolved Photon Mixing for Molecular Contrast in OCT

The nonlinear response of a contrast agent depends on the orientation of the molecular axes with respect to the light polarization, therefore resolution of the nonlinear response with respect to the light polarization would provide molecular orientation information. There have been a number of techniques developed for OCT systems which carefully keep track of the light polarization, in order to determine the birefringence of the sample. Any of these techniques would work for polarization resolved photon mixing OCT, with the addition of the appropriate nonlinear crystals in the reference arm to generate the reference arm light.

One technique would be to illuminate the sample with circularly polarized light, and set the reference arm polarization to 45 degrees. Then a polarizing beam splitter placed before the detectors would send each polarization to its own detector.

The resolution of the nonlinear response with respect to light polarization, effectively provides a map of the molecular hyperpolarizability of the contrast agent, with the largest nonlinear response occurring when the laser polarization is parallel to the molecular axis with the largest hyperpolarizability. Possible applications are for determining the orientation of collagen fibers or the orientation of proteins like green fluorescent protein, which can be incorporated into cell walls.

B.5 Spectral Triangulation Molecular Contrast OCT (STM-COCT)

Unlike the methods mentioned above, this particular method does not require the modification of the contrast agents to any extent during the imaging process. The method, termed spectral triangulation molecular contrast OCT, operates by first acquiring three 3 consecutive OCT scans of the target sample at three evenly spaced wavelength intervals. The second scan is collected at an OCT probe wavelength that closely matches the absorption maximum wavelength of the contrast agent. By comparing the 3 scans and analyzing them, we can extract a differential OCT signal that profiles the differential absorption profile of the sample. This differential absorption profile should then correspond to the distribution profile of the targeted contrast agent within the sample. The method is able to correct for any possible error caused by the spectrally dependent variation (up to the $1^{st}$ order) in the scattering property of the sample.

The advantages of this method are:
1. Low probe intensity requirement. As this is a passive method that extract contrast information from absorption profile measurements, there is no need for high probe intensity or other excitation mechanisms which might not be suitable for clinical applications. The light fluence level employed in the demonstration is within the ANSI standards.
2. Wide potential contrast agent choice. The method can be applied to almost all dyes that have distinct absorption spectra.
3. Insensitivity to scattering inhomogeneity. The method's freedom from scattering inhomogeneity induced artifacts is a significant improvement over other optical methods that have to contend with such artifacts.
4. Simplicity and direct adaptability. The simplicity of the method and its straightforward implementation with current OCT system designs can very significantly lower the entry barrier for its eventual acceptance as a widely applied imaging method in biomedical research and clinical diagnosis.

B.6 Image Reconstruction in Molecular Contrast OCT

The molecular contrast signal acquired with the techniques described in this disclosure, consisting of the differential interferometric signal with the pump on versus off in PPOCT or the differential interferometric signals a function of pump intensity in SAOCT, is cumulative as a function of depth in the sample. Specifically, the PPOCT or SAOCT signal from a given depth in a sample depends upon the cumulative PPOCT/SAOCT signal which the probe beam acquires in traversing regions of the sample between the sample surface and the depth of interest. In the simplest case this dependence is simply an integration over the pump-induced transient absorption over the path of the probe beam to the depth of interest. In addition to integration over the transient absorption, the amplitude of the differential PPOCT/SAOCT signal acquired at every depth in the sample also depends on the amplitude of the optical reflection or scattering received from that depth. In the trivial case, if there is no reflection or scattering over a given depth range in the sample, there will be no PPOCT/SAOCT signal from that range of depth either, and the concentration of molecular contrast agents from that depth range may only be inferred from it's effects on the amplitude of the PPOCT/SAOCT reflections from deeper in the sample. Both of these factors imply that the PPOCT/SAOCT signal acquired from a given sample must be processed in order to extract quantitative information about the location and concentration of molecular contrast agents. A quantitative expression for the differential signal detected in PPOCT as a function of the contrast agent concentration and other parameters is given in Eq. (2) in K. D. Rao, M. Choma, S. Yazdanfar, A. M. Rollins, and J. A. Izatt, "Molecular Contrast in Optical Coherence Tomography using a Pump-Probe Technique," *Optics Letters* 28:340, 2003.

Figures 15A, 15B, 15C, 15D:
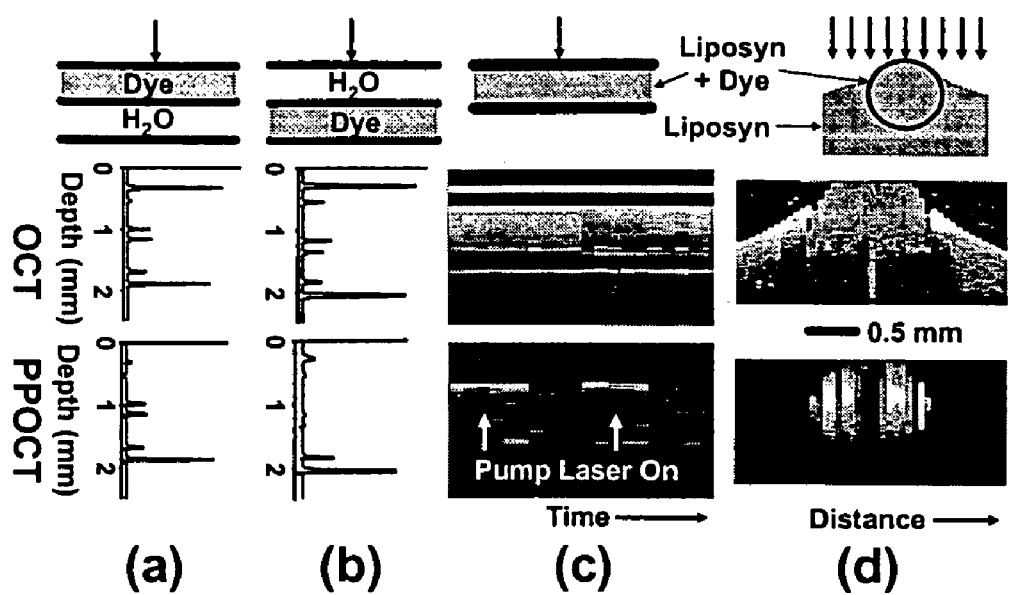
FIG. 15A depicts linear plots of averaged OCT and PPOCT A-scans of a 2-level well phantom.
FIG. 15B depicts linear plots of averaged OCT and PPOCT A-scans of another arrangement of 2-level well phantom.
FIG. 15C depicts log M-scans of OCT and PPOCT in a scattered medium with the pump laser alternatively blocked and unblocked.
FIG. 15D depicts log OCT and PPOCT cross-sectional images of a capillary tube containing dye.
Figures 16A, 16B, 16C:
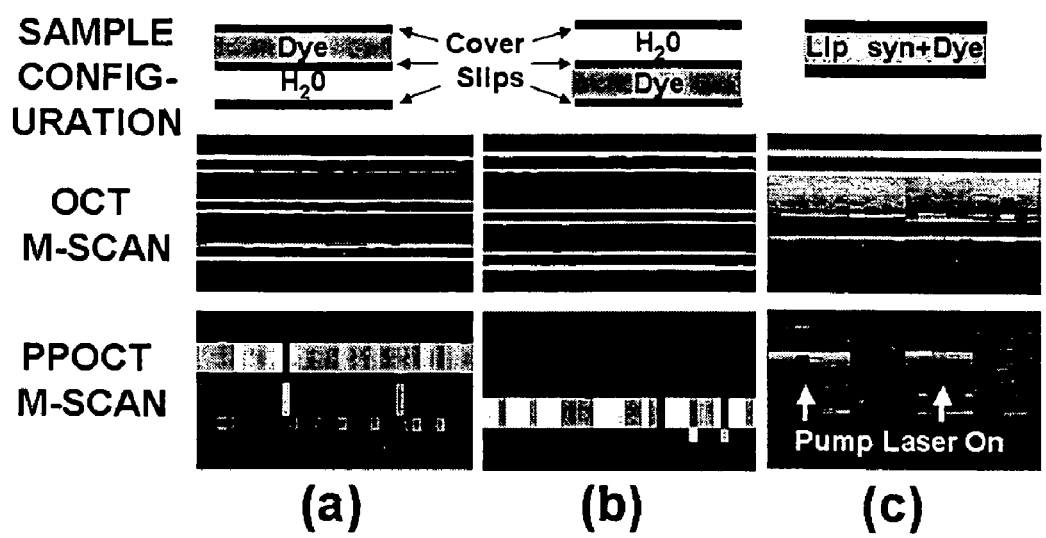
FIG. 16A depicts M-scans corresponding to the OCT and PPOCT A-scans shown in FIG. 15A.
FIG. 16B depicts M-scans corresponding to the OCT and PPOCT A-scans shown in FIG. 15B.
FIG. 16C depicts M-scans of OCT and PPOCT in a scattered medium with the pump laser alternatively blocked and unblocked.

A demonstration of a signal processing approach for extraction of molecular contrast information from a reflection-poor sample is illustrated in FIG. 15 and FIG. 16. In FIG. 15, columns (a) and (b), linear plots of 50 averaged OCT and PPOCT A-scans in a 2-level well phantom containing pure water and ~0.5 mM methylene blue dye in water in alternate locations. Differential PPOCT signals appear at phantom interfaces below the level of the dye. In column (c), log M-scans of OCT and PPOCT in a scattering medium (~0.5 mM methylene blue dye in 0.5% Liposyn) with the pump laser alternatively blocked and unblocked. In column (d), log OCT and PPOCT cross-sectional images of a capillary tube containing ~0.5 mM methylene blue dye in 0.5% Liposyn, partially immersed in 0.5% Liposyn without dye. PPOCT signal localized to within the tube is clearly visualized. In FIGS. 16, (a) and (b), are M-scans of OCT and PPOCT of a 2-level well phantom. Column (c) are M-scans of OCT and PPOCT in a scattering medium with the pump laser alternatively blocked and unblocked. In FIGS. 15 and 16, the sample was a 2-level well phantom, consisting of three microscope cover slips spaced ~500 μm apart with pure water and ~0.5 mM methylene blue dye in water alternatively placed in wells between the slips. Averaged OCT and PPOCT A-scans are displayed in columns (a) and (b), respectively. The depth-resolved PPOCT A-scans clearly show the presence of differential signal at the bottom of the dye layer and at all sequential interfaces, reflecting the cumulative nature of the PPOCT signal. Larger signals (both OCT and PPOCT) are observed at external (glass-air) as compared to internal (glass-water) interfaces. Small artifacts in the PPOCT scans are observed at the level of the top glass-air interface, possibly due to nonlinear receiver response at this large reflection.

In order to extract information about the location and concentration of the contrast agent which resulted in the raw A-scans depicted in FIG. 15 columns (a) and (b), linear PPOCT M-scans were post-processed by normalizing the PPOCT signal amplitude to the OCT peak signal amplitude at each interface, followed by back-projecting the differential PPOCT signal between each pair of interfaces to the space between the interfaces. This back-projection consisted of assigning a PPOCT signal level (which is proportional to the contrast agent concentration) to the region between reflections given by the difference between the PPOCT signal levels (normalized by the corresponding OCT A-scan) at the nearest observable reflections above and below the region of interest. The images resulting from this processing (called M-scans because they correspond to images of processed signal as a function of acquisition time rather than lateral displacement) are plotted in FIG. 16, columns (a) and (b). The location of dye versus water in the wells is clearly resolved; some artifacts possibly due to detector saturation are visible.

The signal processing approach described in the previous paragraph may also be adapted for extraction of quantitative information about the distribution and concentration of contrast agents in scattering media. In preliminary experiments, however, such processing was not necessary for at least qualitative imaging of contrast agents in a scattering medium, as illustrated in FIGS. 15 and 16.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method of determining spatial information about specific molecular contrast agents in a sample comprising the steps of:
   (a) stimulating, at a plurality of intensity levels, the sample thereby altering an optical property of the molecular contrast agent;
   (b) acquiring a plurality of optical coherence tomography (OCT) images, at least some of the plurality of OCT images being acquired at different stimulus intensities; and
   (c) profiling the molecular contrast agent concentration distribution based on the plurality of OCT images.

2. The method of claim 1, wherein the stimulation intensity levels provide transient changes in the optical property of the molecular contrast agent.

3. The method of claim 1, wherein at least some of the stimulation intensity levels provide saturation of the optical property of the molecular contrast agent.

4. The method of claim 1, wherein stimulating the molecular contrast agent increases the optical absorption of the agent.

5. The method of claim 1, wherein stimulating the molecular contrast agent increases the optical transparency of the agent.

6. The method of claim 1, wherein stimulating the sample is performed using light at one wavelength and acquiring the images is performed using light at another wavelength.

7. The method of claim 1, wherein stimulating the sample is performed using light at the same wavelength as the light used for acquiring the images.

8. The method of claim 7, wherein the phase of light used for stimulating the sample is different that the phase of light used for acquiring the images.

9. The method of claim 1, wherein acquiring the images is performed after stimulating the sample.

10. The method of claim 1, wherein acquiring the images is performed while stimulating the sample.

11. The method of claim 1, wherein profiling the molecular contrast agent concentration includes comparing OCT images acquired with the stimulation source active to those acquired with the stimulation source inactive.

12. The method of claim 1, wherein profiling the molecular contrast agent concentration includes comparing OCT images acquired at different intensities of stimulation.

* * * * *